United States Patent
Lally et al.

(10) Patent No.: US 9,606,021 B2
(45) Date of Patent: Mar. 28, 2017

(54) METHODS AND APPARATUS SEGMENTED CALIBRATION OF A SENSING OPTICAL FIBER

(71) Applicant: INTUITIVE SURGICAL OPERATIONS, INC., Sunnyvale, CA (US)

(72) Inventors: Evan M. Lally, Blacksburg, VA (US); Matthew White, Glen Mills, PA (US); Matthew T. Reaves, Baltimore, MD (US); Emily E. Horrell, Blacksburg, VA (US); Sandra M. Klute, Blacksburg, VA (US); Matthew Castellucci, Blacksburg, VA (US); Mark E. Froggatt, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

(21) Appl. No.: 14/899,827

(22) PCT Filed: Jun. 16, 2014

(86) PCT No.: PCT/US2014/042493
§ 371 (c)(1),
(2) Date: Dec. 18, 2015

(87) PCT Pub. No.: WO2014/204839
PCT Pub. Date: Dec. 24, 2014

(65) Prior Publication Data
US 2016/0146699 A1  May 26, 2016

Related U.S. Application Data

(60) Provisional application No. 61/836,297, filed on Jun. 18, 2013.

(51) Int. Cl.
*G01M 11/00* (2006.01)
*G01D 5/353* (2006.01)
(Continued)

(52) U.S. Cl.
CPC ..... *G01M 11/3172* (2013.01); *G01D 5/35354* (2013.01); *G01D 18/00* (2013.01); *G01K 11/32* (2013.01)

(58) Field of Classification Search
CPC .... G01D 18/00; G01D 18/002; G01D 18/004; G01D 18/006; G01D 18/008;
(Continued)

(56) References Cited

U.S. PATENT DOCUMENTS 7,515,276 B2   4/2009   Froggatt et al.
8,773,650 B2   7/2014   Froggatt et al.
(Continued)

OTHER PUBLICATIONS

D. K. Gifford, M. E. Froggatt, and S. T. Kreger, "High Precision, High Sensitivity Distributed Displacement and Temperature Measurements using OFDR-Based Phase Tracking," Proceeding of SPIE, vol. 7753, p. 77533I (May 2011).
(Continued)

*Primary Examiner* — Gordon J Stock, Jr.
(74) *Attorney, Agent, or Firm* — Nixon & Vanderhye P.C.

(57) ABSTRACT

Optical frequency domain reflectometry (OFDR) circuitry to perform tasks on an optical fiber to generate calibration or correction data for calibrating or correcting a reference OFDR data set. A segmented technique is used which permits precise and accurate determination of the correction data for even initial and long fiber lengths. Correction information for each segment is stitched together to generate the correction data for the fiber.

28 Claims, 14 Drawing Sheets

(51) Int. Cl.
  *G01D 18/00* (2006.01)
  *G01K 11/32* (2006.01)

(58) Field of Classification Search
  CPC ........... G01D 5/35354; G01D 5/35358; G01D 5/35361; G01D 5/35364; G01D 5/35367; G01D 5/3537; G01D 5/35374; G01D 5/3538; G01D 5/35303; G01D 5/35306; G01D 5/35309; G01D 5/35312; G01D 5/35316; G01D 5/35319; G01D 5/35322; G01D 5/35325; G01D 5/35329; G01D 5/35332; G01D 5/35335; G01K 11/32; G01K 11/3206; G01K 2011/322; G01K 2011/324; G01M 11/30; G01M 11/31; G01M 11/3172
  See application file for complete search history.

(56) References Cited

U.S. PATENT DOCUMENTS

| | | |
|---|---|---|
| 2008/0024785 A1 | 1/2008 | Froggett et al. |
| 2011/0109898 A1 | 5/2011 | Froggett et al. |
| 2011/0211827 A1 | 9/2011 | Soto et al. |
| 2011/0317148 A1 | 12/2011 | Froggett et al. |
| 2012/0132009 A1 | 5/2012 | Prisco |
| 2014/0336973 A1* | 11/2014 | Froggatt ............ G01B 9/02004 702/104 |
| 2015/0346053 A1* | 12/2015 | Lally .................. G01D 5/35358 356/477 |
| 2016/0123715 A1* | 5/2016 | Froggatt ............ G01D 5/35316 356/477 |
| 2016/0258839 A1* | 9/2016 | Froggatt ............ G01M 11/3172 |

OTHER PUBLICATIONS

Froggatt M., et al., "High-Spatial-Resolution Distributed Strain Measurement in Optical Fiber with Rayleigh Scatter," Applied Optics, May 1998, vol. 37 (10), pp. 1735-1740.

Soller, Brian J. et al., "High resolution optical frequency domain reflectometry for characterization of components and assemblies," Optics Express, Jan. 24, 2005, vol. 13, Issue 2, pp. 666-674.

Written Opinion for Application No. PCT/US14/42493, mailed on Oct. 23, 2014, 5 pages.

International Search Report for PCT/US2014/042493, mailed Oct. 23, 2014, 2 pages.

* cited by examiner

Side View (Vertical)

Plan View (Horizontal)

METHODS AND APPARATUS SEGMENTED CALIBRATION OF A SENSING OPTICAL FIBER

This application is the U.S. national phase of International Application No. PCT/US2014/042493 filed 16 Jun. 2014, which designated the U.S. and claims the benefit of U.S. Provisional Application No. 61/836,297 filed 18 Jun. 2013, the entire contents of each of which are hereby incorporated by reference.

PRIORITY APPLICATION

This application claims priority from U.S. provisional application Ser. No. 61/836,297, filed on Jun. 18, 2014, the contents of which are incorporated herein by reference.

TECHNICAL FIELD

The technology in this application relates to optical measurement apparatus and techniques.

INTRODUCTION

Optical Frequency Domain Reflectometry (OFDR) and distributed shape and position sensing with multi-core optical fiber are described in detail in a number of patents and journal articles (see, e.g., references [1], [2], [3], [4], [5]), and a brief overview is included here for background.

In an OFDR network, shown in FIG. 1, light from a tunable laser source (TLS), which has a frequency scan rate, is launched into an optical fiber interferometer, in which the incoming light is further split into two paths. In the upper path, the light passes through a polarization controller (PC) and a circulator before entering the sensing fiber. Along the length of the sensing fiber, small fractions of the incident light are reflected, either as a result of Rayleigh scatter or at FBGs or discrete reflectors. The reflected light propagates back down the sensing fiber, through the circulator, and is recombined with the incident light from the reference path at a fiber optic coupler. A polarization beamsplitter (PBS) splits the light into two orthogonal polarization states, and the split interference pattern is detected independently at S and P photodetectors.

By applying a Fourier Transform, the frequency-domain OFDR data is converted into a complex-valued signal representing optical backscatter at finely-spaced delay intervals (typically equivalent to approximately 50 μm physical length per point) along the length of the fiber's core.

Fiber optic shape sensing technique may perform a phase-based measurement of distributed strain in each of the sensing fiber's four optical cores. First, OFDR is used to measure the distribution of scattered light along the length of each of the fiber's cores. See FIGS. 2A-2C. This spatially-distributed backscatter can be generated either through Rayleigh scatter or from discrete or continuously-written FBGs. This application uses the fiber's Rayleigh scatter signature for OFDR-based sensing as an example for description purposes.

If a strain is imparted on the optical fiber, its Rayleigh scatter signature or FBG peak will shift in frequency. This frequency shift is linearly proportional to the applied strain. Shape sensing fibers, particularly those with helixed core geometries [see reference 5], are known to generate applied strain which varies in a complex manner along the length of the fiber $\epsilon(\tau)$, where $\tau$ represents optical delay/length along the sensing fiber. The applied strain results in a spectral shift in the OFDR signal which varies as function of delay $\delta v(\tau)$. A coefficient $C_\epsilon$ derived from a strain-optic coefficient scales spectral shift to measured strain. After converting to the delay domain, the spatially-varying frequency shift results in a phase slope which varies as a function of delay.

The phase of the delay-domain OFDR signal is used to measure strain along the length of the optical fiber. This calculation is performed by comparing the fiber in a strained "measurement" state with OFDR data obtained from a "reference" state. In this case, the spectral shift $\delta v(\tau)$ is measured relative to the distributed Rayleigh scatter signature (or FBG spectrum) of the fiber in its reference state. The comparison may be performed by multiplying the reference data by the complex conjugate of the measurement data.

$$\Delta\psi(\tau) = \text{Angle}\{T_0(\tau) \cdot \tilde{T}^*(\tau)\} = 2\pi\delta v(\tau)\cdot\tau \quad (1)$$

Applied strain along the fiber's path, as measured relative to the reference data, can be calculated from the derivative of the differential phase $\Delta\psi(\tau)$.

$$\epsilon(\tau) = \frac{C_\epsilon}{2\pi} \cdot \frac{d}{d\tau}[\Delta\psi(\tau)] \quad (2)$$

In practice, strain measurements are relative in nature. By using this phase-based approach, OFDR scatter measurement algorithms can achieve a density of data needed to interrogate the complex strain profile of a helixed fiber under curvature.

Changes in the fiber's state of strain and temperature cause its apparent optical length to change. This elongation (or shortening) of the fiber results in a misalignment of Rayleigh scatter amplitude data relative to the fiber's reference "fingerprint." In a fiber with constant strain or at a constant elevated temperature, the Rayleigh scatter amplitude of a measurement and reference data sets become increasingly misaligned along the fiber's length.

Rayleigh scatter data is approximately delta-correlated. A shift on the order of a single measurement sample (typically corresponding to approximately 50 um in physical length) causes the delay domain Rayleigh scatter pattern to deviate significantly from the unperturbed reference data. This deviation can be considered as a reduction or loss in coherence and can prevent the sensing algorithm from making a measurement of phase and strain.

In order to account for this phenomenon, and preserve the coherence of the measurement vs. reference data along the entire length of the perturbed measurement fiber, a delay tracking approach can be employed to measure the shift in delay between the measurement and reference data and re-aligns the two data sets sample-by-sample. It can be accomplished by interpolating one of the two data sets such that it has very fine resolution in delay, and then selecting the appropriate interpolated points to account for accumulated delay.

Shape sensing is performed by measuring axial twist and curvature along the length of a helical, multi-core optical fiber (See FIG. 2 and reference [5]). OFDR techniques are used to monitor distributed strain along the lengths of the center core and three outer cores. Members of this "triad" of outer cores are spaced at 120° azimuths, at a fixed radius from the center core. This geometry allows the shape sensing fiber to convert the multi-core distributed strain measurement to three-dimensional distributed position (shape).

When the fiber is under curvature, each of the outer cores experiences alternating states of tension and compression on its helical path through the bend. The three outer cores exhibit sinusoidal strain responses, each 120° out of phase. By comparing the amplitude and phase of these three strain curves, one can determine the applied bend radius and its direction relative to the fiber's coordinate system.

Under twist, all of the three outer cores experience a common-mode strain. If the fiber is twisted in the direction of the helix, a tensile strain is applied to the triad of outer cores. A twist in the opposite direction places the outer cores in compression. By observing the magnitude of the common-mode strain signal, one can determine the distributed state of twist along the length of the sensing fiber. The calculation of extrinsically-applied rate of twist $d\Theta(\tau)/d\tau$ is described in the equation below, in which $\epsilon_n(\tau)$ represents the varying strain along the length of the nth core, and $C_\Theta$ is a scaling constant.

The analysis presented below makes use of the fact that a constant rate of applied twist manifests as a constant difference in strain between the outer cores and the center core (core 0):

$$\frac{d\Theta(\tau)}{d\tau} = C_\Theta \left[ \epsilon_0(\tau) - \frac{1}{3}\sum_{n=1}^{3} \epsilon_n(\tau) \right] \quad (3)$$

This twist measurement is then used to convert the 3D curvature measurement from the fiber's local coordinate system to a fixed "master" 3D grid, defined by the position and vector direction of the fixed launch point at the start of the shape sensing fiber. The center core, which is precisely located in the center of the sensing fiber, experiences negligible first-order strain under curvature and twist. Strain measurements in the center core are used as a reference to compensate for tensile strain and temperature changes in the shape sensing fiber.

All shape measurements, including initial calibration measurements, are made relative to a reference data set. The reference data set is taken with the fiber in a precisely known configuration (often a straight line). All calibration and shape measurements are calculated as deviations in measured strain relative to this configuration. In practice, the reference configuration may be imperfect, causing errors in calibration and final shape results.

One of the most important calibration steps is the measurement of "wobble," which includes variations in the fiber's intrinsic helix rate along its length [see reference 5]. Because the intrinsic helix angle is what determines the calculated direction of a bend, small errors in the measurement of the helix angle can result in large errors in the overall shape calculated.

Wobble is measured by collecting a data set with the fiber held in a planar spiral. This shape generates the oscillatory signals resulting from continuous curvature. Because the fiber is known to be in a flat plane, any deviations in the phase of the oscillating strain signals must be caused by variations in the rate of the fiber's intrinsic helix. This important measurement of wobble requires that the fiber be in a nearly perfectly flat shape—any deviation from the ideal plane generates errors in the map of intrinsic helix along the fiber length. These wobble mapping errors, in turn, result in bend direction errors during subsequent shape measurements.

SUMMARY

The technology includes methods and apparatus for segmented calibration of an optical sensing fiber. In an example embodiment, an optical fiber is positioned into an initial configuration, and an initial optical frequency domain reflectometry (OFDR) data set is determined including phase information for the optical fiber in the initial configuration. An initial OFDR data set for the fiber in the initial configuration may be provided in other manners. A first segment of the optical fiber is positioned into a predetermined configuration, and a first segment OFDR data set is determined including phase information for the first segment of the optical fiber in the predetermined configuration. A next segment of the optical fiber is placed into the predetermined configuration such that the next segment overlaps a portion of the first segment. A next segment OFDR data set including phase information for the next segment of the optical fiber is determined in the predetermined configuration. The first segment OFDR data set is matched with a corresponding first portion of the initial OFDR data set, and the next segment OFDR data set is matched with a corresponding next portion of the initial OFDR data set. Phase information from matching OFDR data sets for the first and next segments in the overlapping portion of the fiber is compared to determine a phase difference for the overlapping portion. The phase difference for the overlapping portion is used to correct the next segment phase information. The first segment phase information is extended using the corrected next segment phase information to generate segment correction data, where at least some of the corrected next segment phase information is for a portion of the next segment that does not overlap the first segment. The segment correction data may then be stored in memory.

One application of the segment correction data is to modify the initial OFDR data set using the segment correction data to generate an OFDR reference data set. The compensation data compensates for changes in temperature or strain that occur between the OFDR data set for initial configuration and the OFDR data set for the predetermined configuration. Two example modification examples are specifically described. In the first, a measurement OFDR data set is generated for a sensing application. The measurement OFDR data set is compared to the initial OFDR data set to determine tracked phase differences. The segment correction data is combined to correct the tracked phase differences, and the corrected phase differences are used in the sensing application. In the second, a phase differential is determined between the segment correction data and initial OFDR data set. The initial OFDR data set is modified with the determined phase differential to generate a reference OFDR data set. The reference OFDR data set is then used in processing a measurement OFDR data set for a sensing application.

In an example implementation, the fiber is wrapped around a spool for the initial configuration, and the predetermined configuration is a straight line.

In an example implementation, a length of the fiber is greater than 2 meters and a length of the segment is on the order of 1 meter.

In example practical implementations, steps c-1 are performed for additional segments of the optical fiber to generate segment correction data for the entire optical fiber. The extending step includes stitching together segment phase information for the first, next, and additional segments of the optical fiber.

In an example embodiment, different stitching locations may be determined along the overlapped portion between the first and next segments. Corrected next segment phase information is then for each of the different stitching locations, and the corrected next segment phase information is evaluated for each of the different stitching locations. One of the different stitching locations is selected for use based on the evaluation. When the fiber is a multicore fiber with multiple cores, the selected stitching location is associated with a lowest twist discontinuity for the multiple cores relative to the other stitching locations.

The first segment may be located along the optical fiber at other than either end of the fiber.

In an example embodiment, the optical fiber includes multiple cores and the segment correction data is used to correct for a wobble factor associated with the optical fiber and/or to correct for a twist factor associated with the multiple cores in the optical fiber.

DETAILED DESCRIPTION

Figure 1:
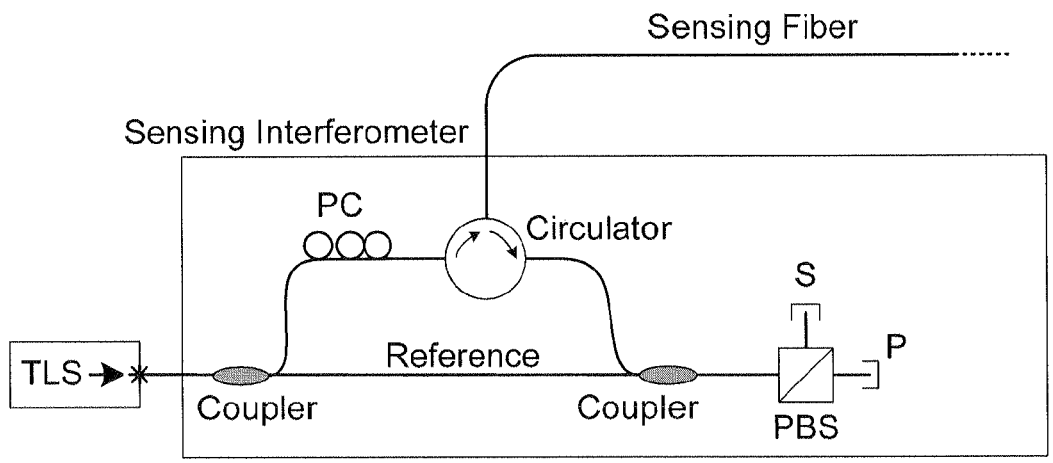
FIG. 1 is a diagram of an example OFDR network.
Figure 2:
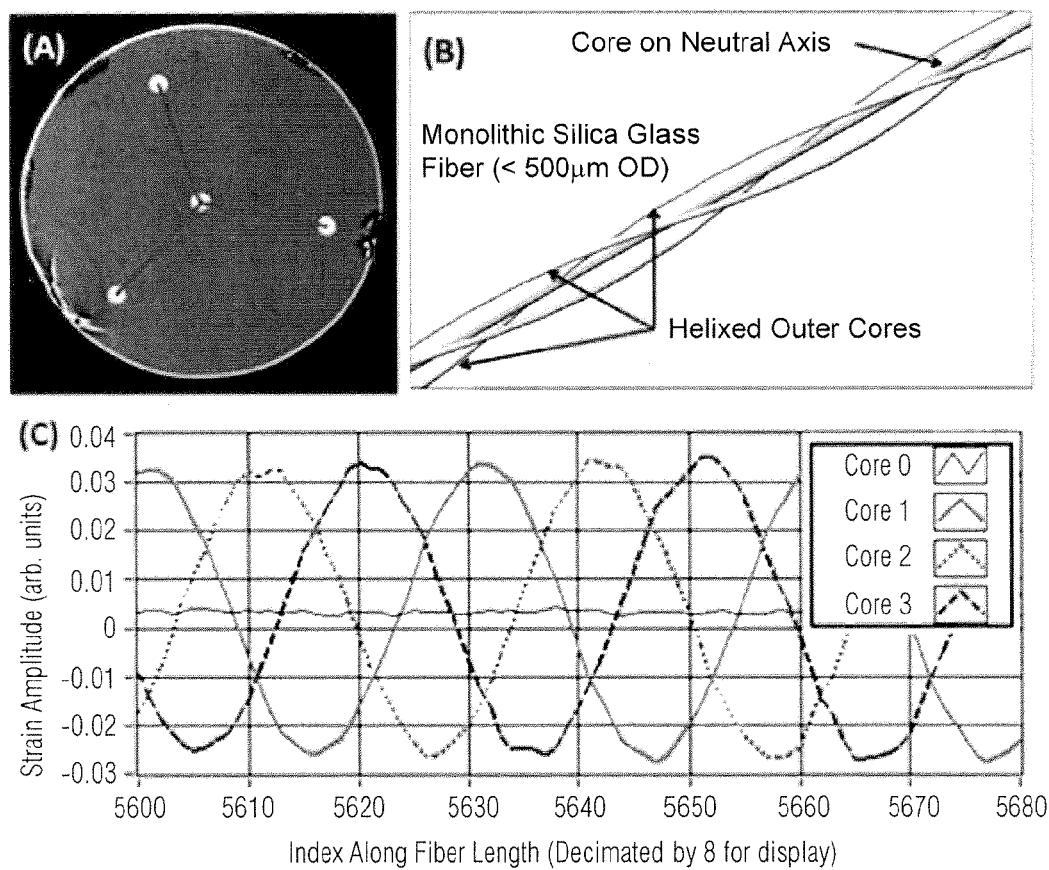
FIG. 2A is a cross section of a multicore fiber that can be used for shape sensing.
FIG. 2B illustrates helical cores along the multicore fiber.
FIG. 2C is a graph of an example four core strain response to external curvature.

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using optical components, electronic components, hardware circuitry (e.g., analog and/or discrete logic gates interconnected to perform a specialized function, ASICs, PLAs, etc.), and/or using software programs and data in conjunction with one or more digital microprocessors or general purpose computers. Moreover, certain aspects of the technology may additionally be considered to be embodied entirely within any form of computer-readable memory, such as solid-state memory, magnetic disk, or optical disk containing an appropriate set of computer instructions that would cause a processor to carry out the techniques described herein.

Hardware implementations of certain aspects of the technology may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The position and shape in three-dimensional (3D) space of a multi-core optical fiber can be measured using Optical Frequency Domain Reflectometry (OFDR)-based distributed strain sensing. Whether using Rayleigh scatter or Fiber Bragg Gratings (FBGs), OFDR makes strain measurements by comparing the signature of the fiber in a perturbed measurement state to data collected with the fiber held in a known reference state, i.e., a reference OFDR data set. Because the multi-core shape sensing fiber is designed to transduce 3D shape to strain, this reference OFDR data set must be collected with the fiber held in a precisely known shape such as a straight line. But the problem is that a precisely straight line of fiber or other precisely known shape of a fiber is very difficult to achieve in practice and particularly so for longer lengths of fiber.

Figure 3:
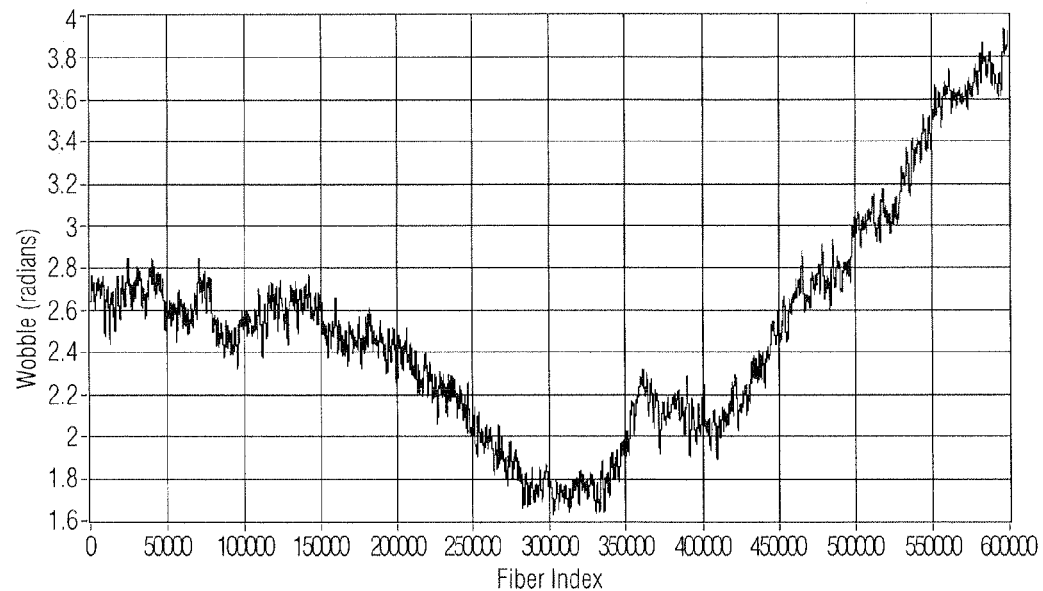
FIG. 3 is a graph illustrating variations in the intrinsic helix ("wobble") measured in a 30 m length of shape sensing fiber.
Figure 4:
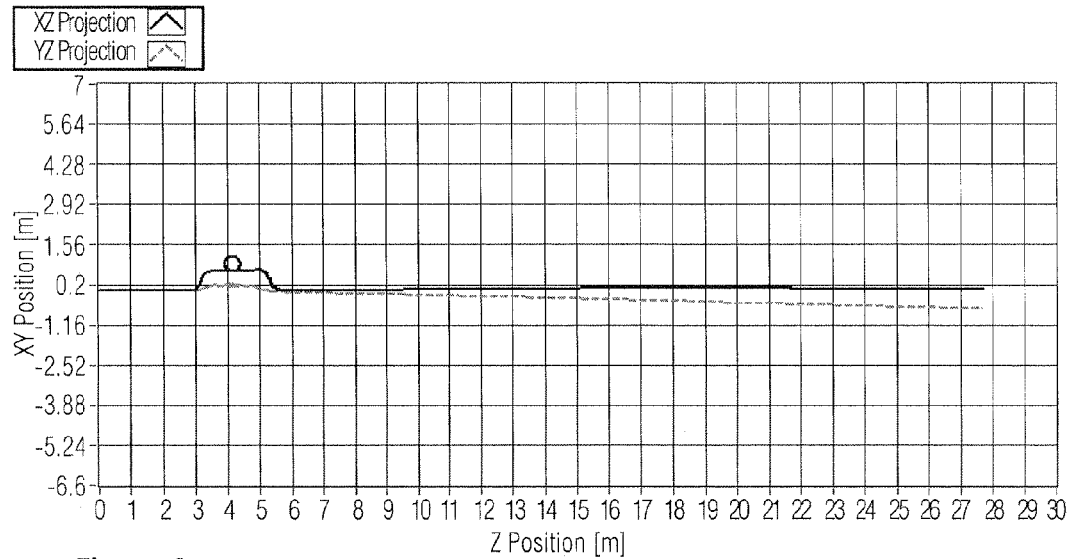
FIG. 4 is a graph illustrating an example 30 m shape measured using wobble calibration with planar projections shown.

In addition, wobble was introduced in the background section. FIG. 3 shows a measured wobble data set for a 30 m shape sensing fiber, and FIG. 4 illustrates a shape measurement processed using this wobble data. In the test shape, the 30 m fiber was routed in a straight line, through a loop, and back onto the line. Any deviation from this line, in either projection, represents shape measurement error. In the data displayed in FIG. 4, the endpoint error at the end of 30 m is approximately 0.5 m.

Figure 5:
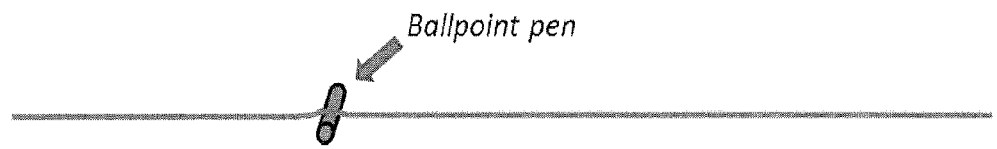
FIG. 5 illustrates a non-straight reference experiment.
Figure 6:
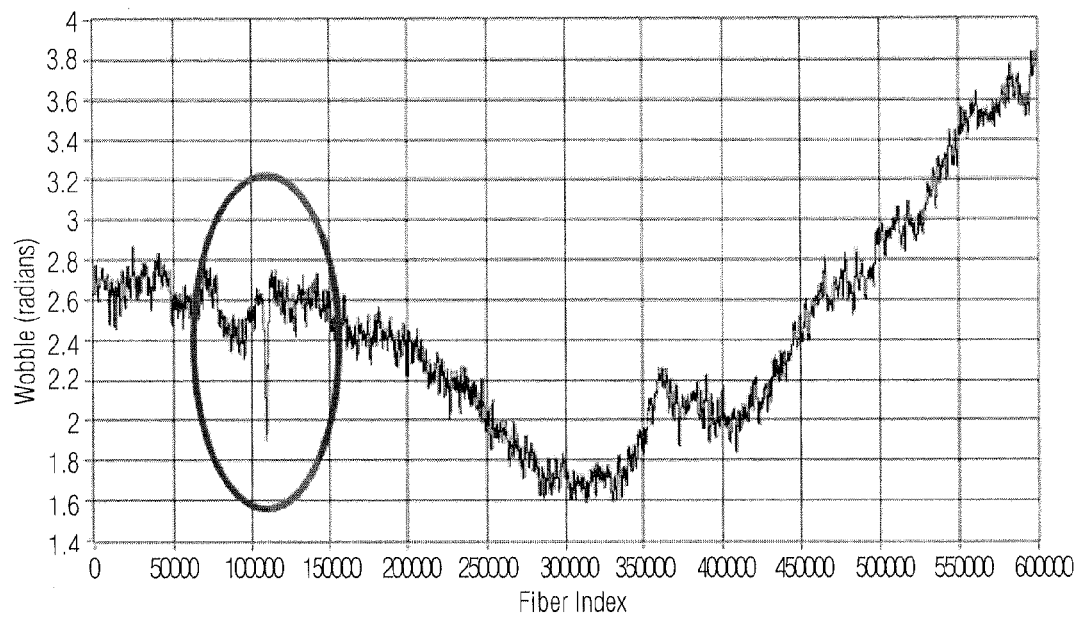
FIG. 6 is a graph illustrating an example wobble measurement error as a result of processing a perturbed, non-straight reference.
Figure 7:
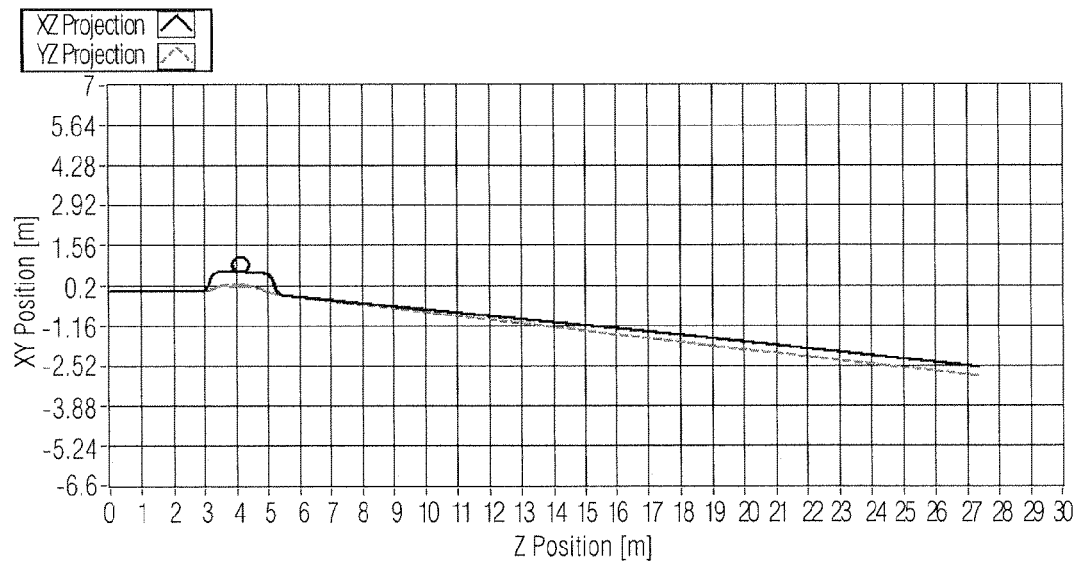
FIG. 7 is a graph illustrating the 30 m fiber shape measurement re-processed with erroneous wobble data and perturbed reference.
Figure 8A:
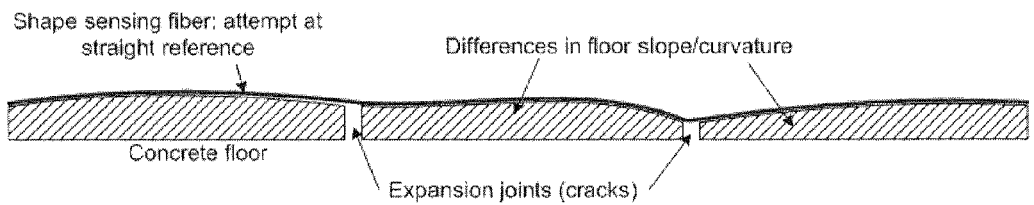
FIG. 8A is a side view of a fiber laid out on a floor.
Figure 8B:
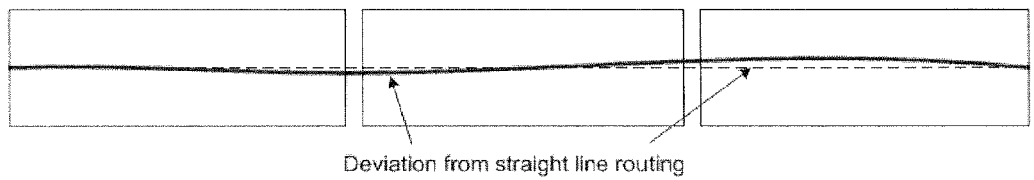
FIG. 8B is a plan view of the fiber on the floor.

In order to demonstrate the effect of a non-precise (e.g., non-straight) reference OFDR data set, a perturbed reference OFDR data set was collected by placing a ballpoint pen under the fiber and collecting OFDR data. See FIG. 5. The pen's diameter was approximately 5 mm. The wobble data is processed relative to the reference OFDR data set. In this sense, the wobble is a relative measurement: the spiraled fiber must be held in a flat plane relative to the planar coordinate system defined by the reference. If there is a perturbation in the reference OFDR data set, that perturbation has the same result as a deviation from the ideal planar wobble spiral. During the processing of calibration data, this perturbation is then falsely interpreted as a variation in the intrinsic helix rate of the fiber. The false spike induced in the wobble data by the ballpoint pen is shown in FIG. 6.

The ultimate result of this wobble measurement error is an error in the measured shape in a shape sensing application which relies on a precise and accurate reference OFDR data set. FIG. 6 shows the planar projections of the same shape data displayed in FIG. 4, reprocessed with the perturbed reference and wobble data. Because it directly couples into twist measurement error, the spike in the wobble data contributes a much larger error than the small 5 mm bump introduced in the reference shape. As a result of the 5 mm bump in the reference data, the 30 m shape sensor's endpoint error is increased to approximately 2.5 m. This example highlights the need for tight control over the straightness of the reference data and illustrates the sensitivity to non-straight reference of the wobble measurement.

A precise correction of the reference OFDR data set is required to define the shape sensing fiber's inter-core geometry and optical properties. Coefficients from this calibration are used to convert the distributed strain measured in each core to a measurement of 3D distributed shape. In practice, the inventors recognized that the precision required to produce accurate shape measurements necessitates that each segment of shape sensing fiber be individually measured to determine corresponding correction data for the reference OFDR data set. The determination of such correction data for the reference OFDR data set for a fiber involves placing the fiber in a series of well-controlled shapes and measuring the strain signature in each configuration, relative to the reference configuration. These OFDR strain measurements are then processed to generate a correction to the original reference OFDR data set.

Figure 9:
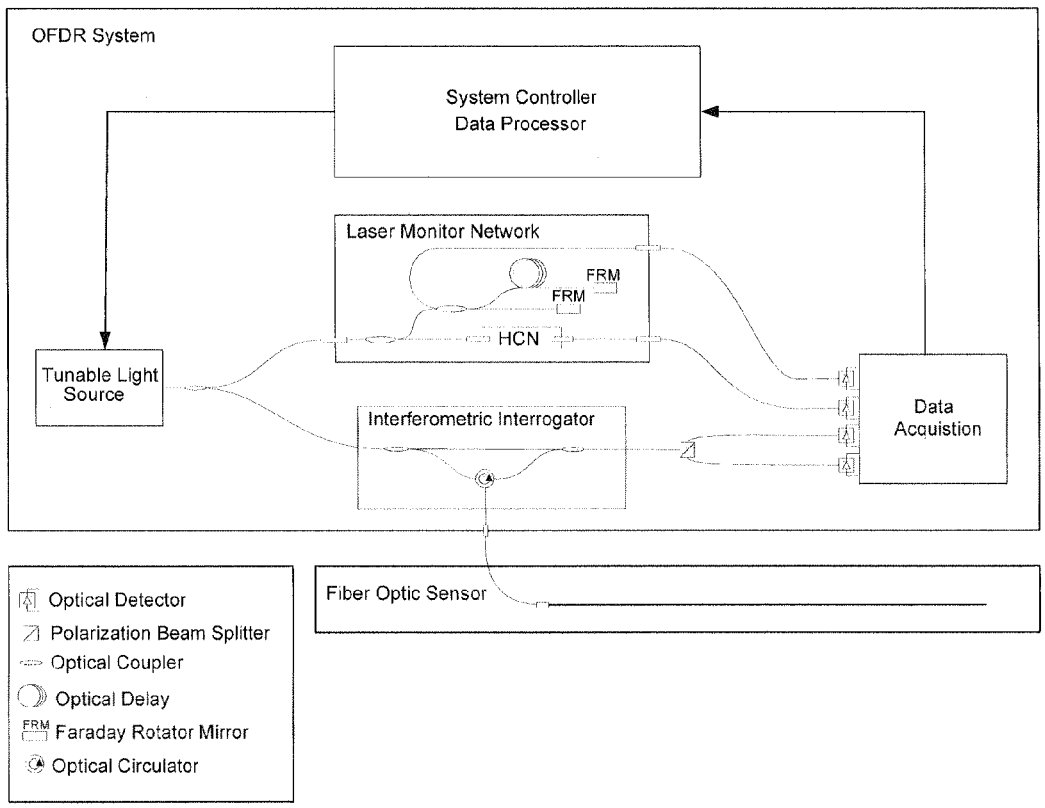
FIG. 9 is a non-limiting OFDR system that may be used to implement a segmented approach to correct or calibrate reference OFDR data.

The quality of the reference data sets is determined, in part, by an operator's ability to fix the fiber precisely in a desired reference shape for determining the reference OFDR data set for that fiber. For short-range fiber sensors (less than 2 m), reference shapes can be achieved by placing the fiber into precision machined plates, grooves, and surfaces. For initial-range sensors (e.g., 2-30 m), it may be possible to create the required reference shapes, but the accuracy of the resulting data sets may not be as high as desired. In general, it is easier to exert a tighter level of control over the fiber's physical shape when the sensor length is relatively short (e.g., less than 2 m). For very long shape sensors (e.g., greater than 30 m), laying the fiber in a perfectly straight line or a tightly controlled curve can be prohibitively difficult or impossible. FIG. 9 illustrates typical sources of non-straight reference error introduced when collecting reference data on a long shape sensing fiber laid on a concrete laboratory or warehouse floor.

Therefore, the referencing of extended-length shape sensors can be greatly improved if the fiber is processed as a set of shorter, easier to handle, segments.

The technology described below determines and applies corrections to reference OFDR data sets data using OFDR data sets corresponding to overlapping segments of the fiber. By collecting and stitching together OFDR data sets in short segments (e.g., 1-3 m long), this data collection and processing technology, referred to as "reference stitching," improves the quality (including both accuracy and precision) of reference OFDR data sets for sensing fibers, and especially for longer-length fiber (e.g., hundreds of meters long). The segment "stitching" includes simply appending segment data sets as well as performing some processing of segment data sets to provide a better "fit" of the segment data.

In addition to correcting the reference OFDR data sets of shape sensing fibers, the segmented reference collection techniques described may also be applied to any fiber optic sensor which uses OFDR to collect a phase-based measurement of other distributed phenomena, such as temperature, pressure, or strain. The sensing fiber acts as a transducer to convert the desired distributed measurement phenomenon into a measurable spectral shift or OFDR phase slope.

Collection of Segmented Reference Data.

In general, a reference OFDR data, set includes distributed OFDR data collected from the entirety of the sensing fiber, which is typically a multicore fiber, while the fiber is held in a well-known, controlled configuration or shape. This reference OFDR data set provides a reference against which to measure delay, phase, and distributed strain in each of the shape sensing fiber's optical cores. Because the reference OFDR data set is collected in a well-controlled configuration or shape, strain measurements performed relative to this reference data can be converted into 3D shape measurements. Although a reference OFDR data set can be made from any configuration or shape, a simple and practical reference configuration or shape is a straight line.

Figure 10:
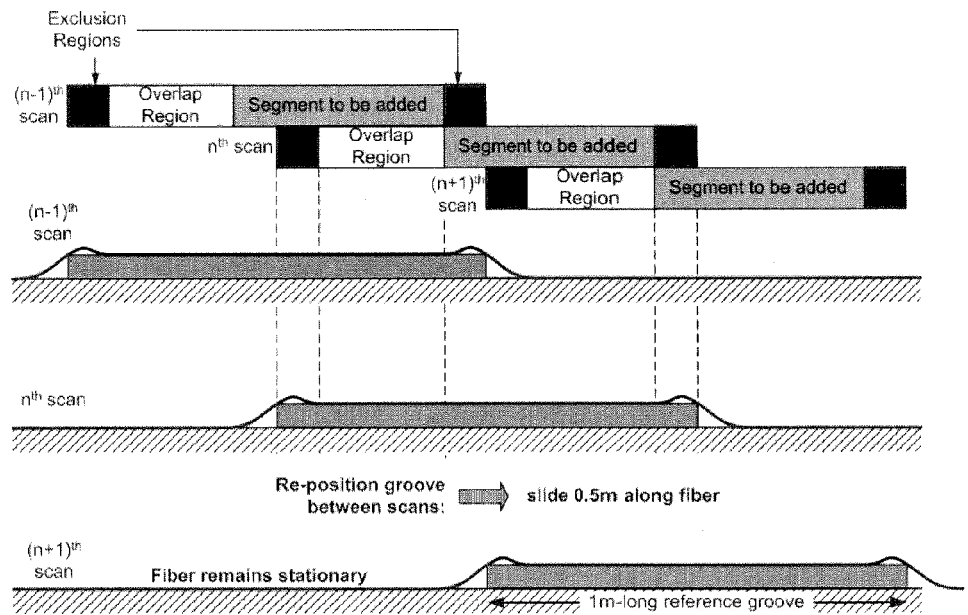
FIG. 10 illustrates segmented data regions and a collection of segmented reference data.

FIG. 10 shows an example OFDR system connected to a fiber optic sensor. The OFDR system includes a tunable light source, an optical network that includes a measurement interferometer and a laser monitor interferometer, a Rayleigh scatter data acquisition (DAQ) system, a system controller data processor including one or more microprocessors for performing processing of Rayleigh scatter data stored in memory along with various processing programs including one or more correlation algorithms. The system controller initiates the sweep of the tunable laser source over an optical frequency range. The light is split between the laser monitor optics and measurement optics. The laser monitor optics typically includes an absolute wavelength reference (though not shown in FIG. 4B) and a relative phase monitor. In a typical reflection OFDR measurement, the light input to the measurement interferometer is split between a reference path and the fiber optic sensor. Reflected light from the sensor comes back through the same path used to inject light into the sensor. In a simple example of a transmission OFDR instrument, the light input to the measurement interferometer is split between a reference path and the sensor, and the light comes back into the measurement interferometer through an output port of the device. In both reflection (Rx) and transmission (Tx) types OFDR measurements, the light from the reference path is combined with light that traverses the sensor the combined light is split by a polarization beam splitter (PBS) and then detected by photo-sensitive s and p detectors. The light from the reference and sensor paths interefere, creating interferograms, and these interferograms are converted by the DAQ into electronic signals representing detected Rayleigh scatter from the sensor, and the signals from the laser monitor are detected and used by the system controller to resample the measured Rayleigh scatter signals to equal optical frequency increments. Signals from an absolute wavelength reference (not shown) are used to spectrally register the acquired data as a function of absolute optical frequency. The system controller Fourier Transforms the resampled data into the temporal domain for filtering and time domain response analysis such as, for example, determination of return loss, group delay, birefringence, beat length, polarization extinction ratio, and optical phase versus delay down the device, and/or construction of the device Jones Matrix. The measurement data may then be Fourier Transformed back to the optical frequency domain for optical frequency domain analysis to determine, for example: insertion loss, phase, group delay, chromatic dispersion, polarization dependent loss, differential group delay, versus optical frequency or wavelength.

During segmented reference data collection, a reference OFDR data set is collected in a series of straight segments. This can be accomplished, for example, using a machined plate or V-groove (see the illustration in FIG. 10). This can also be accomplished by placing the fiber under tension in free space since the shortest distance between two points is a straight line. Although the first segment placed in the V-groove can be either at the proximal or distal end of the fiber, other locations along the fiber may be the starting point of the data collection. OFDR data for the first segment in a V-groove is collected for the entire fiber and stored for post-processing, but only the OFDR data corresponding to region in the V-groove needs to be retained. Then, the fiber is advanced so that part of the first segment remains in the V-groove. The remaining length of fiber in the V-groove is a section of "new" fiber, which was previously not in the precision V-groove during the first OFDR scan. OFDR data is again collected for the next segment for the entire fiber and stored, but only the OFDR data corresponding to the fiber now in the V-groove needs to be retained. The fiber is continually advanced in steps and scanned, each time leaving a length of "overlap" fiber in the V-groove from the previous OFDR scan, until the entire length of the fiber has been advanced through the V-groove, such that every portion of the fiber was in the V-groove during at least one scan.

Non-limiting example embodiments are described which include collection and processing of reference data based on a straight line. In one test case performed by the inventors, each segment of reference OFDR data was collected with the aid of a 1 m-long V-groove machined into a thick steel plate. Thus, the segment length in the non-limiting example described below is 1 m.

As illustrated in FIG. 10, analysis of the segment data preferably includes defining three distinct regions in each fiber segment: exclusion, overlap, and add regions. In one example, these lengths may be empirically predetermined and applied to each segment as a percentage of overall segment length. Example criteria for determining each of the three segment length parameters are described in the following paragraphs.

Exclusion regions shown in FIG. 10 represent the lengths of fiber leading onto and off of the reference shape plate. It is assumed that the fiber is not perfectly straight in these regions. In this example, 10% (10 cm) is excluded from each end of the 1 m segment to provide a reasonably-straight fiber in the reference region.

The overlap region shown in FIG. 10 represents the length of fiber in the reference groove which was also in the reference groove in the previous scan. Between scans, the groove has been re-positioned relative to the fiber, but the length of fiber in the overlap region is held straight in both the current and previous reference segment OFDR data sets as shown in FIG. 10. This overlap region is used for alignment and stitching of adjacent reference segments. Because the overlap region can be assumed to be straight in both the $(n-1)^{th}$ and $n^{th}$ segments, data in this region can be compared during data processing to determine any changes in the fiber that may have occurred between the $(n-1)^{th}$ and $n^{th}$ OFDR scans. These changes may include, but are not limited to, changes in temperature, tensile force, and twist state that result in phase slope and phase offset changes to OFDR data. In this non-limiting example, the overlap region is set to 40% of the overall 1 m segment length for comparison of the fiber's state in neighboring segment scans.

The segment of fiber to be added represents the remaining length on the reference plate. OFDR data for the segment to be added region is modified based on a comparison of overlap regions between subsequent segments. The modified OFDR data set for each segment is stitched together with the modified OFDR data set for the next segment. This stitching process continues for most or all the segments for the fiber to generate a final stitched reference OFDR data set. In this non-limiting example, both the overlap and add regions have equal length, e.g., 40 cm. Depending on the available lengths of fiber, the first and last reference segment scans may contain smaller or nonexistent overlap regions.

Segment Comparisons with Initial Reference OFDR Data Set.

The following describes an example modification of an initial reference OFDR data set. Although the fiber in the reference groove is assumed to be straight during each segment scan, the ambient temperature, strain, or the twist state of the fiber may change during the process of repositioning the fiber between scans. Any change in the fiber's state must be measured against a baseline data set which is termed the initial reference OFDR data set. In order to properly measure changes in the fiber's state between adjacent segments, this initial reference OFDR data set is preferably continuous and smoothly-varying so as not to mask or obscure the effects of segmented OFDR data collection.

To this end, an initial reference OFDR data set is collected with the fiber held in a loosely-controlled configuration or shape, e.g., wrapped around a spool is practical for longer fibers. OFDR data sets include phase data. Subsequent segment comparisons are made by determining or "tracking" a phase difference between the segment OFDR data, e.g., obtained with the fiber in the groove, and the continuous initial reference OFDR data set. Because the configuration or shape of fiber for the initial reference OFDR data set is uncontrolled, the relative phase of a given reference segment is also uncontrolled. However, the overlap region of two adjacent segments represents two measurements of the same length of fiber held in precisely the same shape. Therefore, for the $(n-1)^{th}$ and $n^{th}$ segments, this uncontrolled relative phase measurement should be exactly the same in the overlap regions of the $(n-1)^{th}$ and $n^{th}$ segments. Differences are typically but not limited to being a result of differences in temperature, strain, or twist.

For long fibers, a large-diameter spool provides a convenient shape to determine an initial reference OFDR data set. However, in this example, the initial reference OFDR data set was collected with the fiber laid in an approximately straight line on the laboratory floor.

Figure 11:
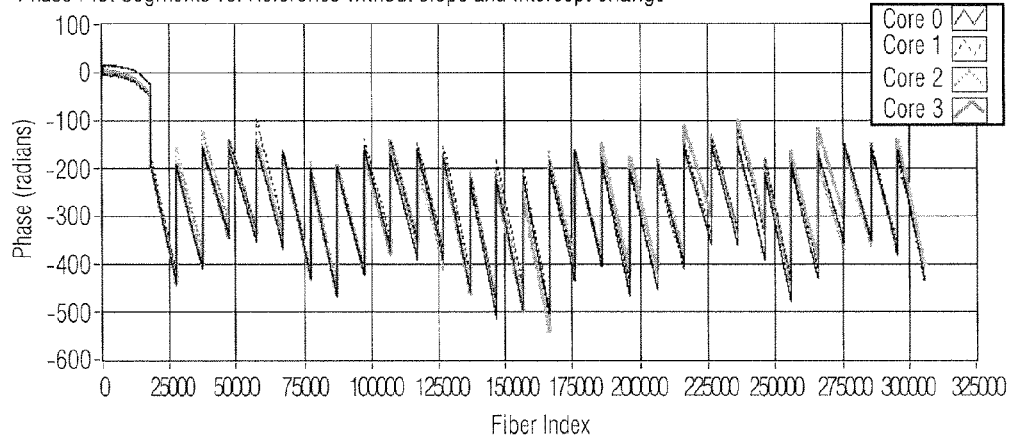
FIG. 11 compares phase along the length of an example segmented reference OFDR data set.

FIG. 11 shows a compilation of this relative phase measurement for a non-limiting example data set with 30 segments. Each portion of the segmented reference was collected by sliding the fiber through a 1 m V-groove, as described in the non-limiting example above. Phase differences were then made between the initial and segment OFDR data sets for each of the 30 reference segments against the initial reference. These phase differences are "windowed" to the segment in the V-groove and spliced together to form a stitched phase measurement. Windowed means that portions of the data set at the beginning and the end of the data set, labeled the exclusion regions in FIG. 10, are truncated because this data can be less reliable.

The sawtooth pattern of the stitched segmented phase measurement in FIG. 11 illustrates changes in the state of the fiber between the collection of neighboring segment scans. As described above, a constant temperature shift or constant applied strain results in a linear phase slope. The data presented in FIG. 11 was collected by comparing straight segment OFDR data sets to a quasi-straight initial reference OFDR data set. In the absence of curvature or complex strain profiles, the measured phase is expected to be roughly linear for each segment. FIG. 11 shows that this is indeed the case. The linear phase response in each segment means that the segment OFDR data sets were collected at a different temperature, strain, or state of twist than the initial reference OFDR data set, and that difference is uniform across the length of the segment. Small variations in this slope from segment-to-segment indicate that this temperature/strain state changed slightly while the fiber was being advanced in the groove.

The large discontinuities in the stitched phase data arise from differences in the state of the fiber leading up to the segment data region. The phase measurements in FIG. 11 begin at a point several thousand indices before the straight segment region. During each measurement, this "lead-in" region of fiber is subjected to its own, uncontrolled state of strain and temperature. Although not shown in the stitched plot, the resulting phase in the lead-in region of each measurement accumulates to an uncontrolled value at the start of the segment measurement. This uncontrolled accumulation of phase leading up to each reference segment is responsible for the large offsets at the transitions between segments.

The data in FIG. 11 represents a direct appending of segmented phase data without adjusting for differences in the fiber's state during collection of adjacent segment OFDR data. At each appendage location, the OFDR data contains a discontinuity in both phase and phase slope. If the OFDR data were directly appended together and used as a shape sensing reference OFDR data set, these discontinuities would be interpreted as large, rapid changes in strain along the fiber's length and would contribute to significant errors in the shape measurement.

Smooth Stitching of Segmented Phase Data.

Figure 12A:
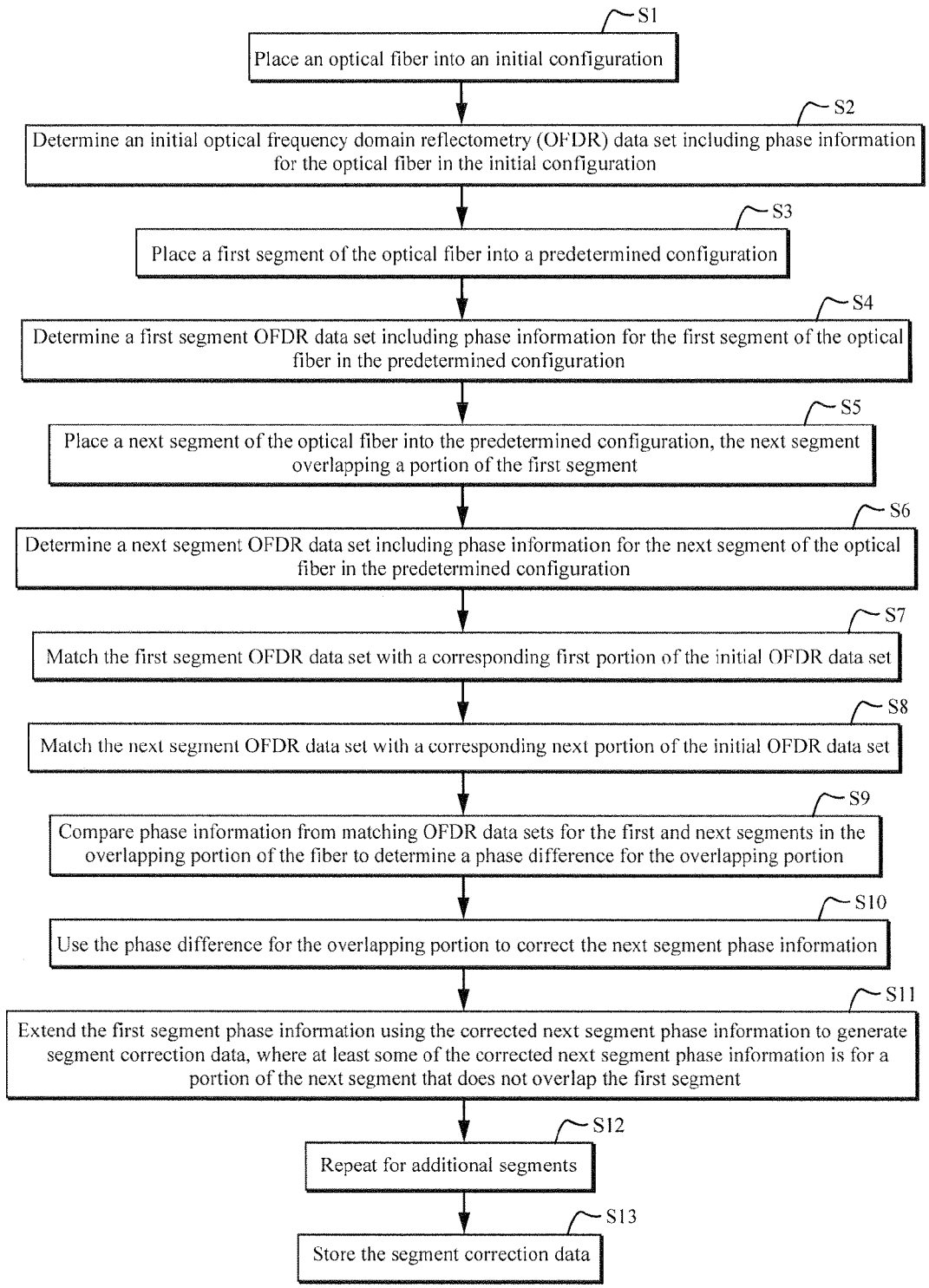
FIG. 12A is a flowchart of example, non-limiting, machine-implemented steps for implementing a segmented approach to correct or calibrate reference OFDR data.

In order to create a reference OFDR data set with a more smoothly-varying phase response, a segment stitching process preferably accounts for differences in strain, temperature, and/or twist during the collection of adjacent segment data. FIG. 12A is a flowchart of example, non-limiting, machine-implemented (e.g., computer-implemented) steps for implementing a segmented approach to correct or calibrate reference OFDR data, which accounts for all these differences to create phase correction data usable to correct or calibrate an initial data set so that it functions as an accurate and precise reference OFDR data set.

Initially, an optical fiber is positioned into an initial configuration (step S1), and an initial optical frequency domain reflectometry (OFDR) data set is determined including phase information for the optical fiber in the initial configuration (step S2). A first segment of the optical fiber is then placed into a predetermined configuration (step S3), and a first segment OFDR data set is determined including phase information for the first segment of the optical fiber in the predetermined configuration (step S4). A next segment of the optical fiber is positioned into the predetermined configuration so that the next segment overlaps a portion of the first segment (step S5). A next segment OFDR data set is determined including phase information for the next segment of the optical fiber in the predetermined configuration (step S6). The first segment OFDR data set is then matched with a corresponding first portion of the initial OFDR data set (step S7), and the next segment OFDR data set is matched with a corresponding next portion of the initial OFDR data set (step S8). The phase information from matching OFDR data sets for the first and next segments in the overlapping portion of the fiber is compared to determine a phase difference for the overlapping portion (step S9). The phase difference for the overlapping portion is used to correct the next segment phase information (step S10). The first segment phase information is extended using the corrected next segment phase information to generate segment correction data. At least some of the corrected next segment phase information is for a portion of the next segment that does not overlap the first segment (step S11). This process is repeated for additional segments (step S12), and the segment correction data is stored in memory (step S13).

Figure 12B:
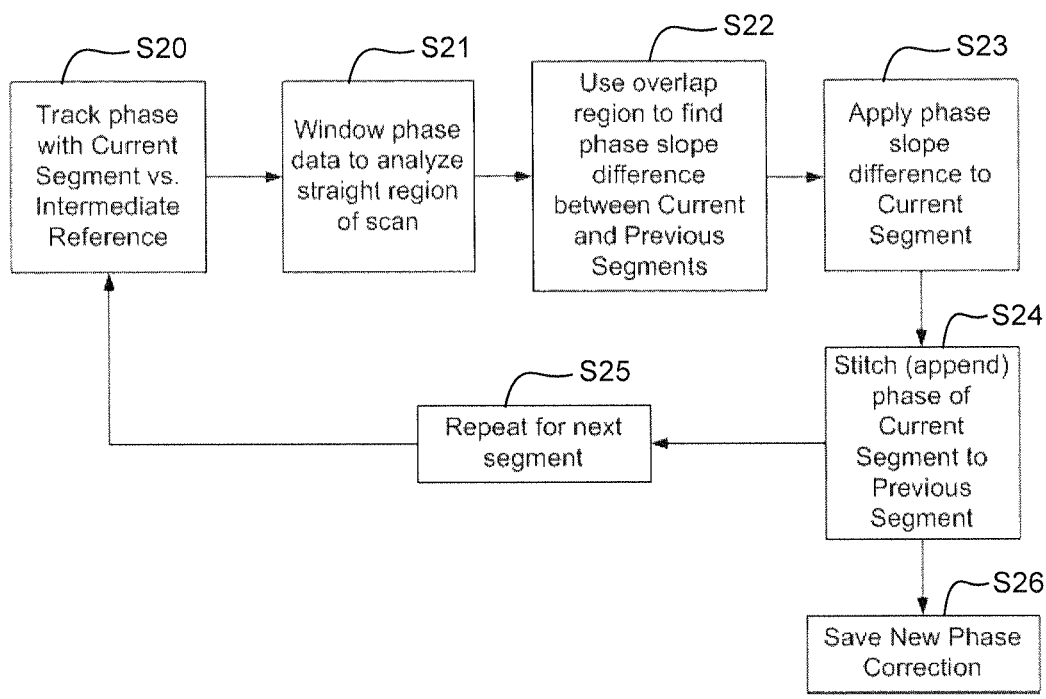
FIG. 12B is a flowchart of example, non-limiting, machine-implemented steps for stitched phase adjustment algorithm used with a test example embodiment.

FIG. 12B is a flowchart of example, non-limiting, machine-implemented steps for stitched phase adjustment algorithm to create a continuous, smoothly-varying phase curve from a collection of segments for the test example. As above, reference segment OFDR data is collected, for example as described above, using a straight reference groove and advancing the fiber in such a way as to maintain 50% overlap between the position of the groove during current and previous scans. Once segment data is obtained for the whole length of interest for the fiber, the data processing algorithm loops through the series of segments, analyzing each one individually and appending it to the total stitched phase curve. For each segment, the OFDR phase for that segment is compared (tracked) to the phases in the initial (labeled intermediate in the figure) reference OFDR data set to find the best match corresponding to the location of that segment along the fiber (step S20). This phase data is then windowed to focus only on the length of fiber in the controlled reference groove (step S21). The windowing step is optional and could also be performed earlier in the algorithm. In the overlap region, the segment's phase is compared to the phase of the previous segment (step S22). If the straight fiber's temperature, strain, or twist state was not changed when the fiber was advanced, these two overlapping phase measurements would be identical. But in practice, this is not the case. This comparison in step S5 may be performed by subtracting the two overlapping phase measurements (from the overlapping initial reference and segment OFDR data sets) to generate a phase difference.

It may useful to also perform a linear fit on the phase difference to determine an intercept of the linear fit which represents the phase discontinuity which results from accumulation of phase in the lead-in fiber. The slope of the linear fit represents the difference in strain or temperature in the segment region between adjacent segment scans. The use of a linear fit (as opposed to a higher-order fitting function) assumes in this non-limiting example that the only differences in strain, temperature, and twist are constant along the length of the reference segment. Other fitting functions may also be used, with different physical implications.

The linear fit data obtained in the overlap region is extrapolated to provide an estimate of the phase offset and differential slope between current and previous segment phase data (step S22). See again FIG. 10 which illustrates various segmented data regions. The phase difference, in this example the estimate of the phase offset and differential slope, is subtracted from the segment phase data to match the phase response of the previous segment (step S23). Once the current segment's phase data is adjusted, it is appended or stitched to the end of the most recent stitched reference phase data set for the fiber (step S24). The process is repeated (step S25) for each segment until the end of the fiber or other desired endpoint is reached.

The first segment analyzed has no overlapping segment to which it can be compared. Therefore, the first segment may be included in the stitched phase data set with no adjustment. The subsequent adjustments essentially remove strain, temperature, or twist differences to bring the segments following the first segment to the same state as the fiber during collection of the initial reference OFDR data set. The stitched phase corrections may be stored in memory for subsequent use (step S26) such as for shape sensing.

Figure 13:
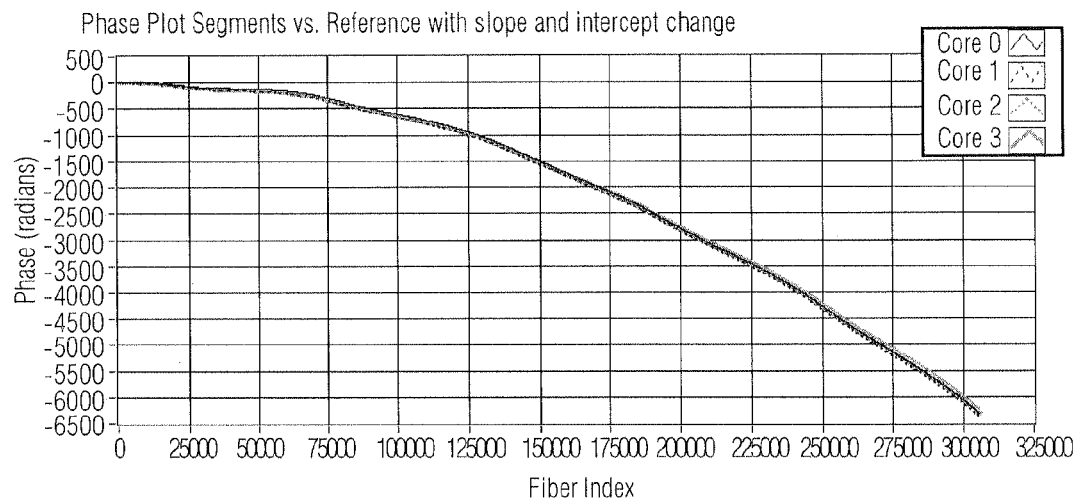
FIG. 13 is a graph of compiled phase data from 30 segment scans in the test example embodiment using the stitched phase adjustment algorithm in FIG. 12B.
Figure 14:
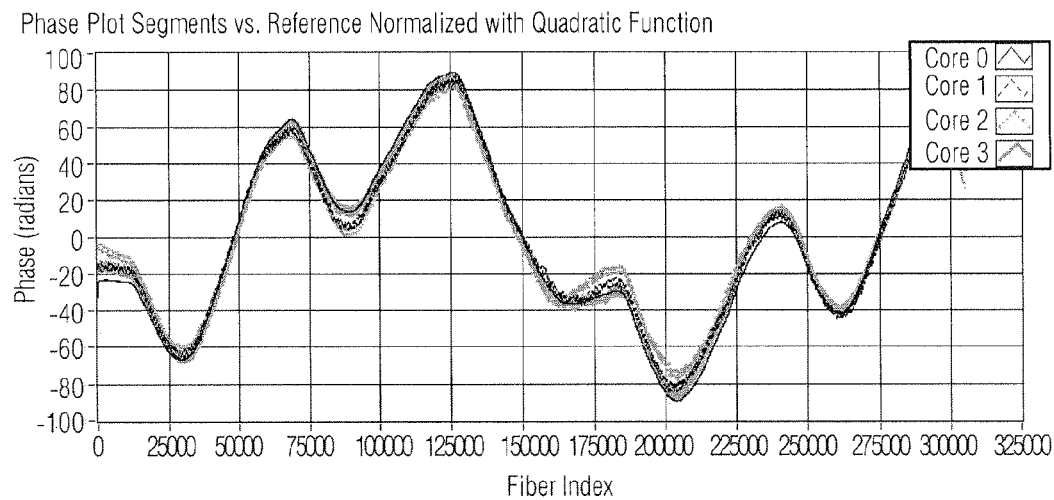
FIG. 14 is a graph of compiled phase data from FIG. 13 normalized by subtracting a quadratic fit.

FIGS. 13 and 14 illustrate the results of the phase adjustment and stitching algorithm when applied to the same test data set of 30 segment scans originally shown in FIG. 11. By comparing the phase in the overlap regions of adjacent scans, the algorithm is able to remove discontinuities in the phase and its derivative. The quality of the resulting reference OFDR data is evident in FIG. 14, which shows a detailed view of the stitched phase after removal of the apparent quadratic slope. This large quadratic drift, evident in FIG. 13 is a result of finite precision on the fitted phase comparison measurement. Because it is very slowly varying, it is unlikely to significantly affect the resulting shape measurement.

Figure 15:
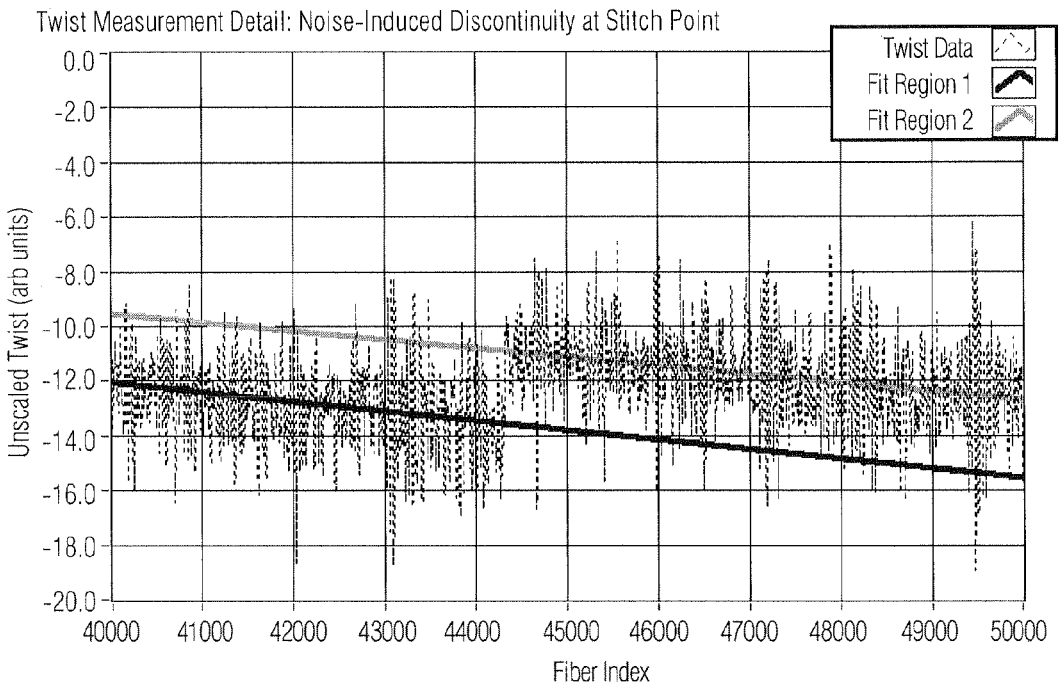
FIG. 15 is a graph showing twist data processed from stitched reference phase compared to initial reference OFDR data.

Although the stitched phase data in FIGS. 13 and 14 appears to be free from discontinuities, the downstream shape sensing calculations are sensitive to very small levels of noise in the reference data. The wobble measurement example in FIGS. 5-8 demonstrated this sensitivity. One way to evaluate the quality of the stitched reference OFDR data set is to measure its twist contribution. FIG. 15 depicts a detailed view of this twist contribution centered on the transition between adjacent reference segments. Because the twist measurement is sensitive to noise in the processed phase, the small phase discontinuity left after stitching manifests as an observable discontinuity in the measured twist.

Figure 16:
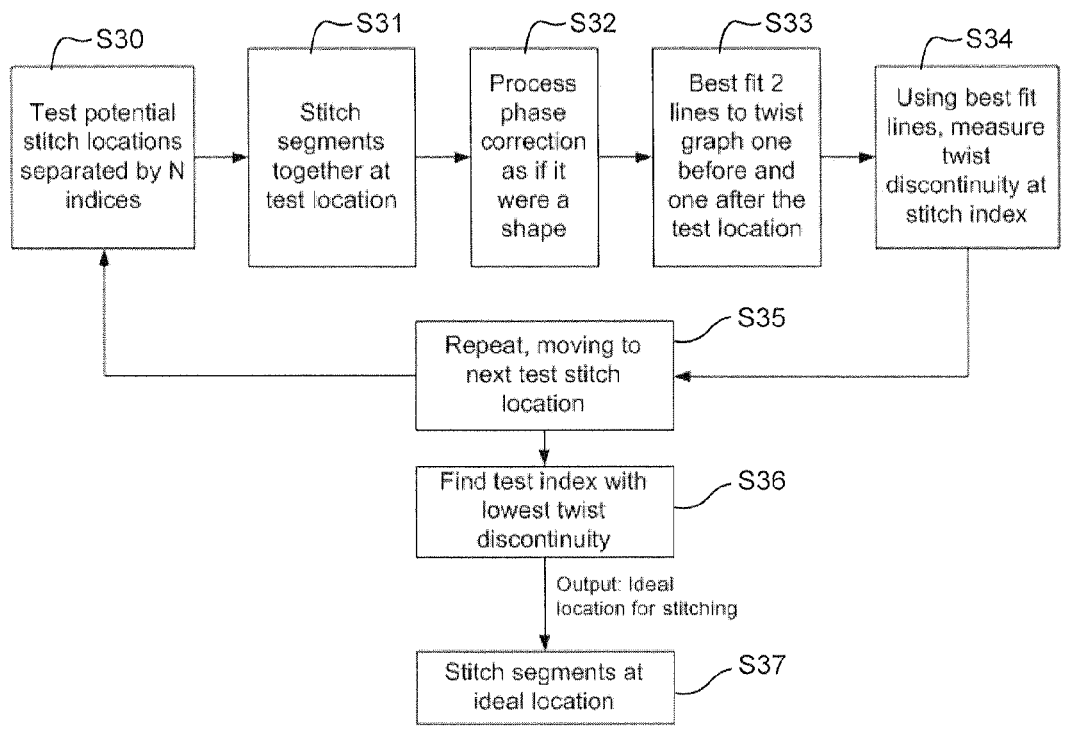
FIG. 16 is a flowchart of example, non-limiting, machine-implemented steps for an example adaptive stitching algorithm.

In any data set, there exists a finite level of noise in the processed phase. Upon close inspection, these small jumps in the stitched reference twist occur when two neighboring segments are stitched at a sub-optimal location relative to the noise in the four phase curves. In order to improve the quality of the stitched reference phase, the exact start and stop regions of the overlap and stitch portions of any stitch may be adjusted to optimize for continuity. One such algorithm is described in FIG. 16. This "adaptive stitching" algorithm developed by the inventors searches for an optimal location within the noisy phase data to append (a stitch point or location in the overlap region) each new "next" segment.

After collection and phase processing of a reference segment, the adaptive stitching algorithm tests a number of potential locations to perform the stitch (step S30). At each location, the algorithm appends the new "next" data (step S31) and calculates the additional twist of the entire reference phase data (step S32). Next, the adaptive stitching algorithm performs two linear fit operations on the calculated twist data: one fit in the region immediately prior (step S33), and one fit in the region immediately after the stitch location under test (step S33). The offset between these two best fit lines, shown in FIG. 15, provides a quantitative measurement of the discontinuity in the stitched twist data (step S34) and a quality metric for the choice of stitch location.

After looping through a total of N potential stitch locations (step S35), the algorithm then selects the location which has the smallest twist discontinuity (step S36). Finally, the algorithm appends the new reference segment phase data at this optimized location and moves on to repeat the process for the next reference segment (step S37). This process is made possible by the existence of overlap and exclusion regions (FIG. 10), which provide a buffer with which to make slight adjustments to the length of each phase segment and the location at which segments are appended to the stitched reference data array. Typical example adjustments in the stitch location are on the order of 100 indices (on the order 0.5 mm along the length of the fiber).

Figure 17:
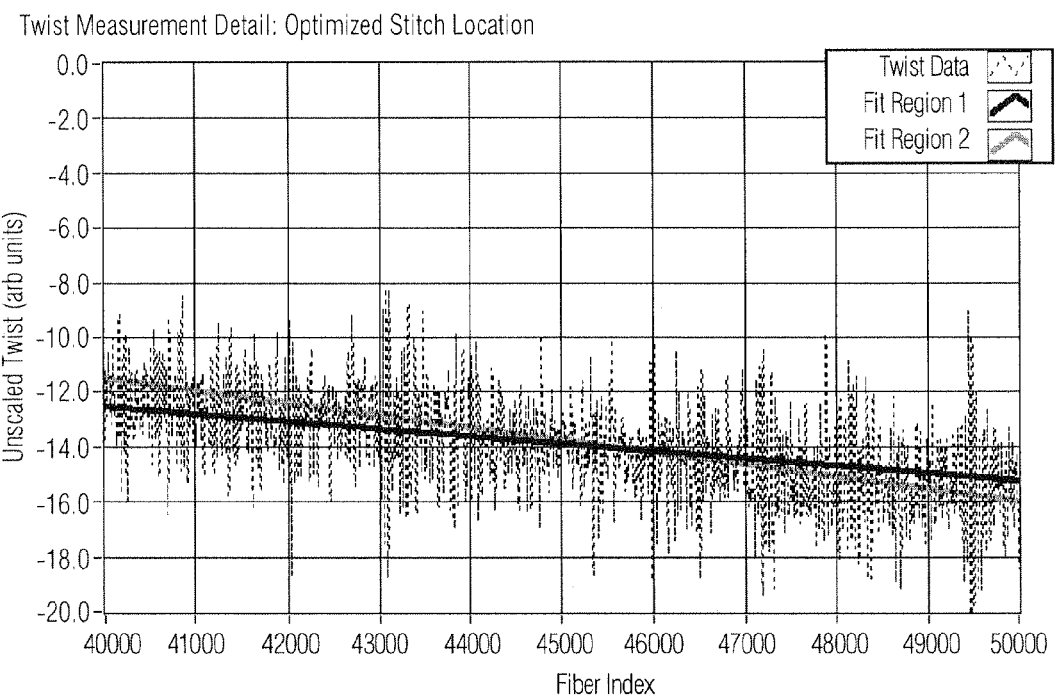
FIG. 17 is a graph showing segmented twist data after processing by the adaptive stitching algorithm for a test example.

FIG. 17 illustrates the twist data at the same segment transition as shown in FIG. 15. The data in FIG. 17 has been processed using the adaptive stitching algorithm, and after optimizing the location at which the segment is appended, the discontinuity in the processed twist has been eliminated. The adaptive stitching method described above is preferred over filtering or averaging methods, which invariably result in a loss of data. By choosing the location at which the small amount of phase noise in one reference segment most closely matches that of its neighbor, the adaptive stitching algorithm minimizes noise in the resulting twist signal without compromising the overall quality or content of the phase data.

Application of Stitched Phase Correction to Reference Data.

The technology described produces a continuous set of reference phase data from a series of OFDR data segments. This phase data is a comparison between the composition of individual straight segments and the continuous, uncontrolled, initial OFDR data set. In preparation for use as a shape sensing reference, this stitched reference phase data is applied as a correction to the initial reference. Therefore, this "stitched reference correction" effectively numerically "straightens" the otherwise curved and twisted initial reference. The application of the stitched reference correction may be performed in variety of ways. Two non-limiting examples are now described.

Example correction method 1 adds phase correction to initial reference phase. Equation 12 describes delay-domain phase $\Delta\psi(\tau)$ as a comparative measurement between the OFDR scatter pattern in the optical fiber at two different states: a reference state and a measurement state. The process of reference stitching introduces a third "initial reference" state. From these three states, the following delay-domain scatter data variables are defined:

| Data Set | OFDR Scatter Data Variable |
| --- | --- |
| Initial Reference | $T_I(\tau)$ |
| Stitched Reference Correction | $T_S(\tau)$ |
| Measurement Data | $T_M(\tau)$ |

It is possible to make a variety differential phase measurements based on different combinations of these three OFDR data sets. During calibration, the phase of the stitched reference correction is measured relative to the initial reference, generating the constant array $\Delta\psi_{SI}(\tau)$.

$$\Delta\psi_{SI}(\tau) = \text{Angle}\{T_S(\tau) \cdot T_I(\tau)\} \tag{19}$$

Figure 18:
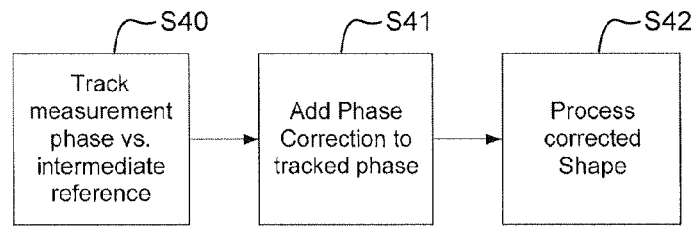
FIG. 18 is a flowchart of example, non-limiting, machine-implemented steps for applying phase correction in accordance with an example embodiment.

When making shape measurements with the calibrated fiber, the phase of each measurement data set is also tracked relative to the continuous initial reference, resulting in the term $\Delta\psi_{MI}(\tau)$ (step S40 in the flowchart in FIG. 18).

$$\Delta\psi_{MI}(\tau) = \text{Angle}\{T_M(\tau) \cdot T_I(\tau)\} \tag{20}$$

As an initial step in the shape processing algorithm, the stitched reference correction is applied by subtracting the constant phase $\Delta\psi_{SI}(\tau)$ from the measured phase $\Delta\psi_{MI}(\tau)$ (step S41). The result is $\Delta\psi_{MS}(\tau)$, a phase measurement made relative to a stitched straight reference. The example process is described in flowchart form in FIG. 18. It is performed on each core individually, and then four corrected phase measurements are then combined to create a processed shape (step S42).

$$\Delta\psi_{MS}(\tau) = \Delta\psi_{MI}(\tau) - \Delta\psi_{SI}(\tau) \tag{21}$$

This simple additive method works because the phases of the stitched reference and the measurement are both tracked relative to the same initial reference OFDR data set. As a result, the initial reference defines a constant segmentation of the fiber. In other words, the physical location of each data sample along the length of the fiber is defined relative to the sample's delay as measured in the initial reference. Using a common stitched reference during the calculation of both $\Delta\psi_{SI}(\tau)$ and $\Delta\psi_{MI}(\tau)$ guarantees that both sets of phase data are properly aligned in the delay domain. The additive reference correction is therefore valid even in the case in which the fiber experiences a large accumulation of strain or temperature change along its length.

Figure 19:
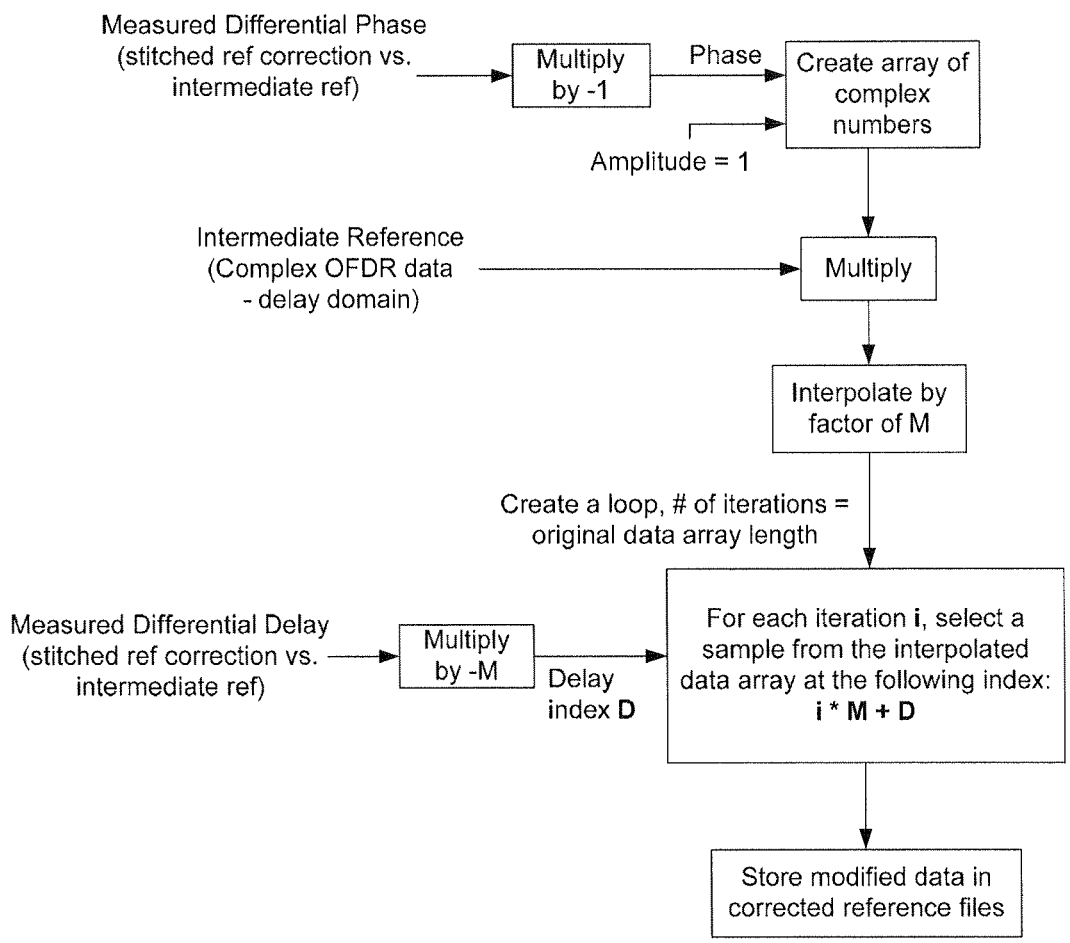
FIG. 19 is a flowchart of example, non-limiting, machine-implemented steps for applying phase correction in accordance with another example embodiment.

A second example method 2 applies phase and delay directly to raw initial reference OFDR data. The stitched reference correction can also be applied directly to the raw initial reference data. This process is described in FIG. 19. In preparation for this correction, both the phase and the differential delay of each stitched reference segment are tracked relative to the initial reference. Each of these arrays is then stitched together using the methods described in the preceding sections. This process results in two stitched reference correction arrays: a phase correction and a delay correction.

Next, the phase correction is applied directly to the initial reference's complex Rayleigh scatter data. This is accomplished by creating an array of complex numbers with unity magnitude whose phase is equal to the negative of the stitched phase correction $\Delta\psi_{SI}(\tau)$. These complex numbers are then multiplied by the initial reference data, removing the measured strain associated with curvature and twist along its length.

So as not to generate errors during subsequent phase tracking measurements, the delay of the initial reference data is also adjusted. This is accomplished by interpolating the delay-domain initial reference data by a factor of M. Next, a new reference data array is formed by extracting selected samples from the interpolated array. If no delay adjustment were made, the algorithm would select every $M^{th}$ sample. To remove accumulated delay, the algorithm adjusts the sample index by $-M^*$total delay. Finally, the modified OFDR data is stored as a new, corrected reference for use in later shape measurements. The modified initial reference behaves as though it were a straight, continuous shape reference data set.

Example Test Application and Test Results.

The example algorithms and procedures described above were tested using a 20 m length of helixed shape sensing fiber. An initial reference was collected with the fiber placed in a relatively straight line on a concrete warehouse floor. As depicted in FIG. 1, although an attempt was made to keep the fiber as straight as possible, this initial reference inevitably contains some unwanted curvature.

Next, while it was still in an approximately straight shape, a 3 m-long extruded V-groove was inserted underneath the shape sensing fiber. Segmented reference data was then collected by manually advancing the V-groove extrusion along the length of the fiber and collecting OFDR measurement data. At each step, the V-groove advanced approximately 1 m.

Figure 20:
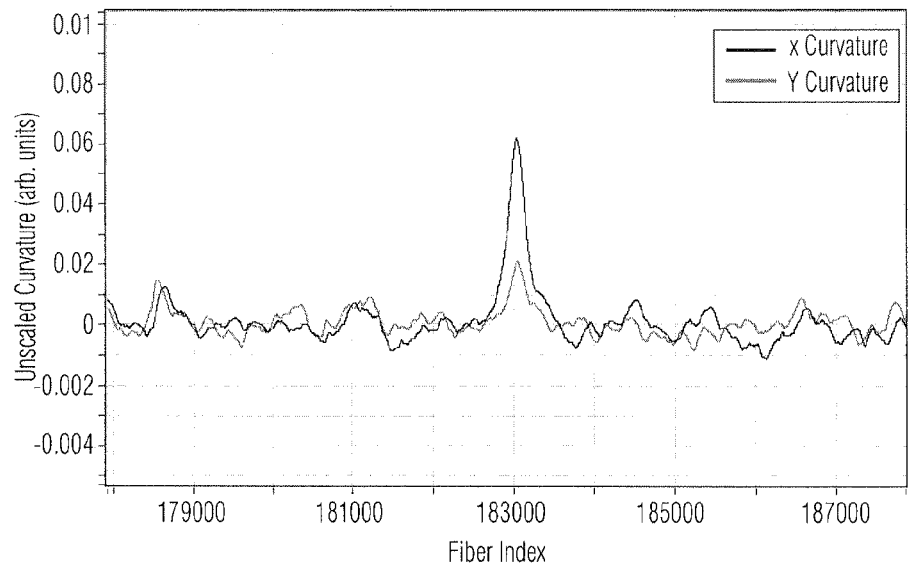
FIG. 20 is a graph illustrating curvature measurement in a region of reference defect.

Phase tracking comparisons were performed between each reference segment and the initial reference data. These phase measurements were then processed using the shape sensing algorithm to extract curvature and twist. FIG. 20 illustrates the calculated curvature difference between one of the reference segments and the initial reference. There is a clear spike in the curvature at the location where the initial reference crossed an expansion joint in the concrete floor.

Figure 21:
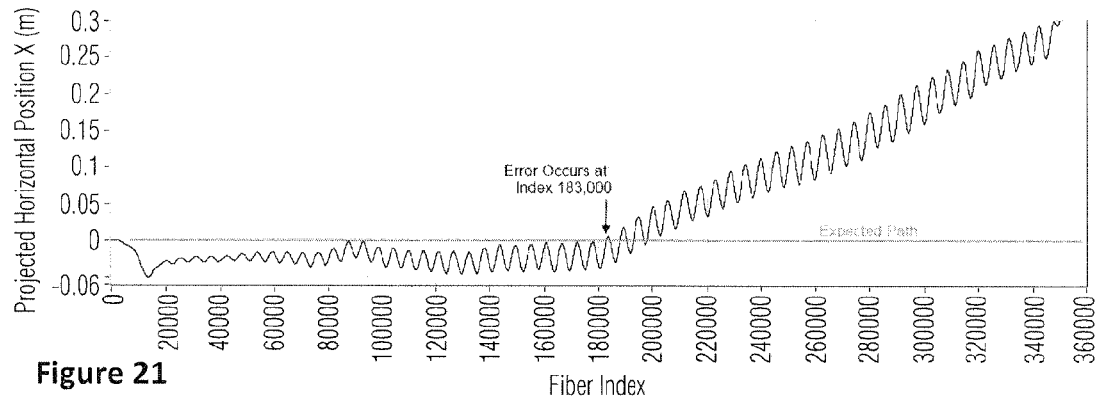
FIG. 21 is a graph illustrating a horizontal projection of shape measurement vs. initial reference OFDR data.

Next, measurement data was collected with the fiber routed in a sinusoidal shape. FIG. 21 illustrates the horizontal projection of the measured shape when processed vs. the initial reference. As expected, the measured shape veers in an incorrect direction at the same location where there is a known defect in the reference. The endpoint error of this shape is estimated to be approximately 3% of the total length.

Figure 22:
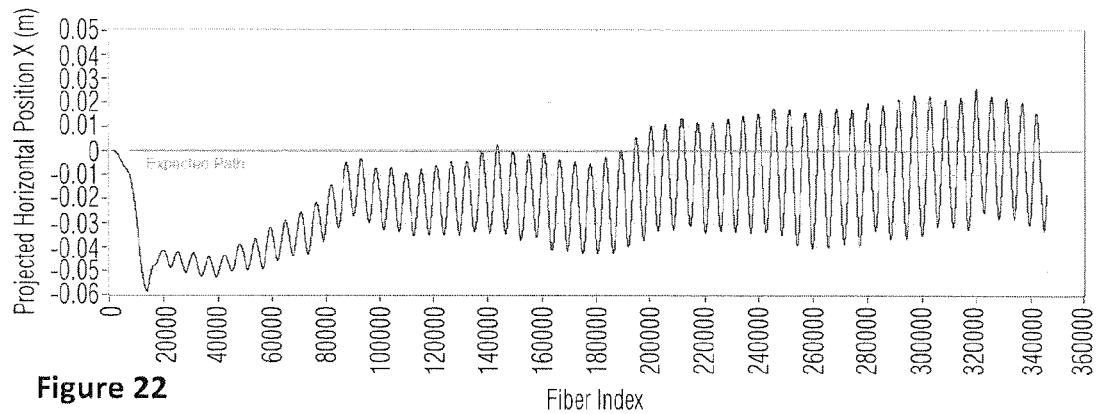
FIG. 22 is a graph illustrating a horizontal projection of shape measurement vs. initial reference OFDR data after stitched reference data correction.

Finally, the stitched reference data was used to correct the imperfections in the laboratory floor reference via the additive phase technique (Example Correction Method 1 described above). The phase-corrected reference was then used to process the same sinusoidal shape shown above. FIG. 22 shows the horizontal projection of the measured shape. In this case, the reference stitching technique was able to remove the unwanted curvature in the initial reference, correcting the error in the shape and reducing the endpoint error to less than 1% of the total length.

Use of Multiple Reference Segments from a Single Scan.

Figure 23:
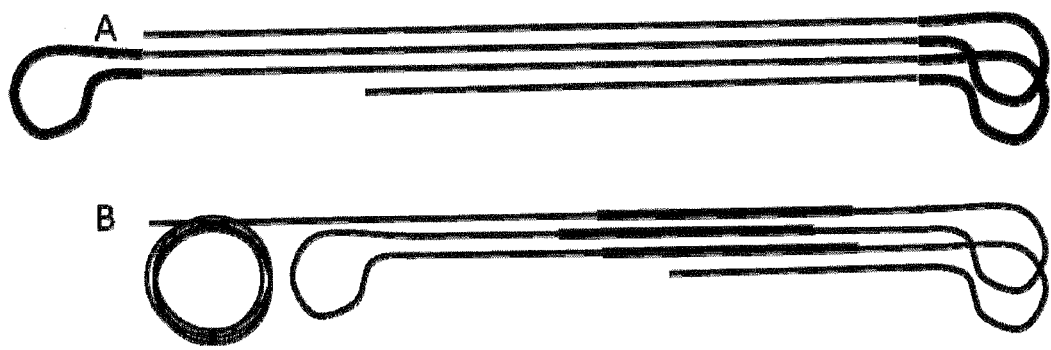
FIG. 23 shows example test fiber configurations for building a stitched reference OFDR data set.

In an alternate embodiment of reference stitching, fewer scans are used to create a stitched reference OFDR data set using data obtained from multiple non-contiguous straight sections on the fiber during a single scan. This test was implemented on a 100 m shape fiber using two fiber configurations. The first configuration was used as the initial reference, while the second was used to correct only the non-straight regions of the first. The reference stitching algorithm was adjusted to work for just two 100 m scans, each with a series of 25 m straight sections, as shown in FIG. 23. The non-straight sections of fiber in the first configuration (A darker lines) are straight in the second configuration (B).

Figure 24:
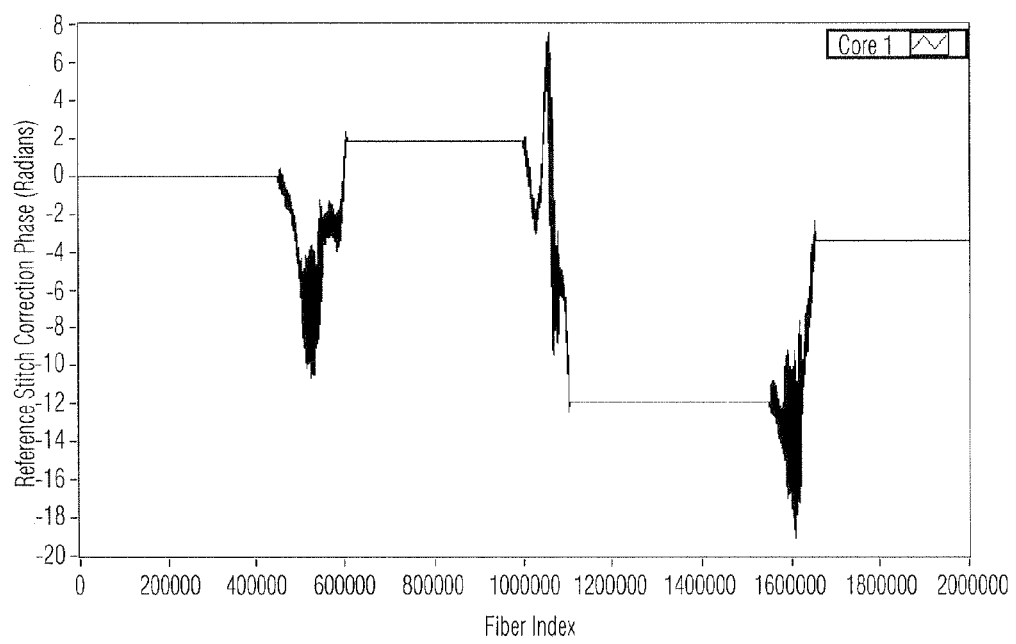
FIG. 24 is a graph showing correction to an initial OFDR data set based on a second OFDR scan with straight sections aligned with curved regions.

These two scans were combined to build a 100 m stitched reference. The resulting stitched reference phase correction for a single outer fiber core (Core 1) is shown in FIG. 24. In the regions where the initial reference (Scan A) was straight, the correction phase is purposefully set to zero. In the regions where Scan A was curved, the Core 1 correction phase 1 displays the phase oscillation indicative of curvature. Low-frequency variations are likely due differences in the strain, generated by the physical movement of the fiber between scans.

Figure 25:
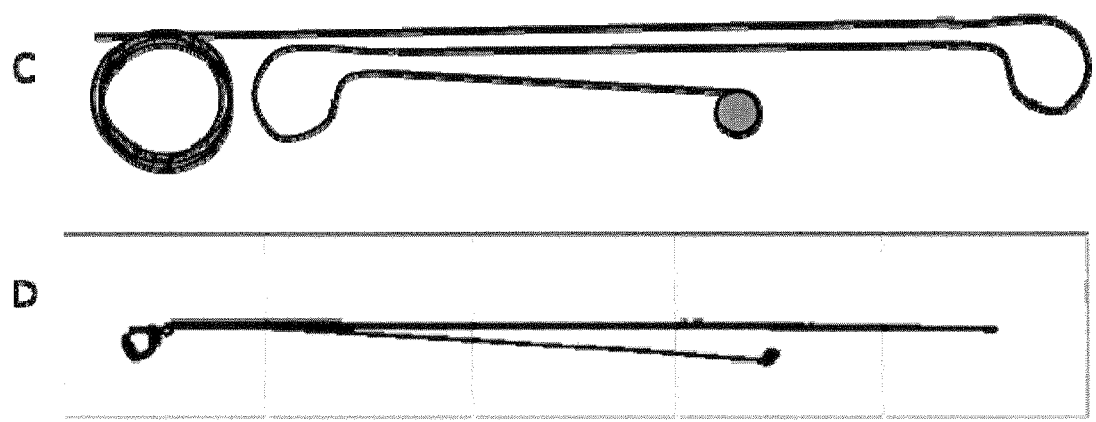
FIG. 25 shows an example fiber shape measurement using an example corrected reference OFDR data set.

FIG. 25 depicts the test results of this segmented data collection technique. After processing the stitched reference correction, the corrected reference was used to measure a test shape. FIG. 25 (C) depicts the layout of the 100 m long fiber during this test. FIG. 25 (D) is the horizontal projection of the resulting 3D shape data, which shows that the corrected reference produces a valid shape measurement.

Although the description above contains many specifics, those specifics should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

REFERENCES INCORPORATED HEREIN BY REFERENCE

[1] M. Froggatt and J. Moore, "High-spatial-resolution distributed strain measurement in optical fiber with Rayleigh scatter," *Applied Optics*, vol. 37, no. 10, pp. 1735-1740, 1998.
[2] Soller, Gifford, Wolfe, and Froggatt, "High resolution optical frequency domain reflectometry for characterization of components and assemblies," *Optics Express*, Jan. 24, 2005.
[3] M. Froggatt, R. J. Seeley, D. K. Gifford, and others, "High resolution interferometric optical frequency domain reflectometry (OFDR) beyond the laser coherence length," U.S. Pat. No. 7,515,276 April 2009.
[4] D. K. Gifford, M. E. Froggatt, and S. T. Kreger, "High precision, high sensitivity distributed displacement and temperature measurements using OFDR-based phase tracking," *Proc. SPIE*, vol. 7753, p. 775331 (2011).
[5] M. E. Froggatt, et. al., "Optical Position and/or Shape Sensing," U.S. patent application Ser. No. 12/874,901 (2010).

The invention claimed is:

1. A method comprising the steps of:
a—placing an optical fiber into an initial configuration;
b—determining an initial optical frequency domain reflectometry (OFDR) data set including phase information for the optical fiber in the initial configuration;
c—placing a first segment of the optical fiber into a predetermined configuration;
d—determining a first segment OFDR data set including phase information for the first segment of the optical fiber in the predetermined configuration;
e—placing a next segment of the optical fiber into the predetermined configuration, the next segment overlapping a portion of the first segment in the predetermined configuration;
f—determining a next segment OFDR data set including phase information for the next segment of the optical fiber in the predetermined configuration;
g—matching the first segment OFDR data set with a corresponding first portion of the initial OFDR data set;
h—matching the next segment OFDR data set with a corresponding next portion of the initial OFDR data set;
i—comparing phase information from matching OFDR data sets for the first and next segments in the overlapping portion of the first segment and the overlapping portion of the next segment to determine a phase difference for the overlapping portions;
j—using the phase difference to correct the next segment phase information;
k—extending the first segment phase information using the corrected next segment phase information to generate segment correction data, where at least some of the corrected next segment phase information is for a portion of the next segment that does not overlap the first segment; and
l—storing the segment correction data.

2. The method in claim 1, further comprising modifying the initial OFDR data set using the segment correction data to generate an OFDR reference data set.

3. The method in claim 1, wherein the correction data compensates for changes in temperature or strain that occur between the OFDR data set for initial configuration and the OFDR data set for the predetermined configuration.

4. The method in claim 1, further comprising:
generating a measurement OFDR data set for a sensing application;
comparing the measurement OFDR data set to the initial OFDR data set to determine tracked phase differences;
combining the segment correction data to correct the tracked phase differences; and using the corrected phase differences in the sensing application.

5. The method in claim 1, further comprising:
determining a phase differential between the segment correction data and initial OFDR data set;
modifying the initial OFDR data set with the determined phase differential to generate a reference OFDR data set; and
using the reference OFDR data set in processing a measurement OFDR data set for a sensing application.

6. The method in claim 1, wherein the initial configuration is the fiber wrapped around a spool.

7. The method in claim 1, wherein the predetermined configuration is a straight line.

8. The method in claim 1, wherein a length of the fiber is greater than 2 meters and a length of the first segment is on the order of 1 meter.

9. The method in claim 1, wherein the first segment is located along the optical fiber at other than either end of the fiber.

10. The method in claim 1, wherein the optical fiber includes multiple cores and the method further comprises using the segment correction data to correct for a wobble factor associated with the optical fiber.

11. The method in claim 1, wherein the optical fiber includes multiple cores and the method further comprises using the segment correction data to correct for a twist factor associated with the multiple cores in the optical fiber.

12. The method in claim 1, further comprising:
performing steps c-1 for additional segments of the optical fiber to generate and store further segment correction data for the additional segments of the optical fiber.

13. The method in claim 1, further comprising:
determining different stitching locations along the overlapped portion between the first and next segments;
determining corrected next segment phase information for each of the different stitching locations;
evaluating the corrected next segment phase information for each of the different stitching locations; and
selecting one of the different stitching locations to use based on the evaluation.

14. The method in claim 12, wherein the extending step includes stitching together segment phase information for the first, next, and additional segments of the optical fiber.

15. The method in claim 13, wherein the fiber is a multicore fiber with multiple cores, and wherein the selected stitching location is associated with a lowest twist discontinuity for the multiple cores relative to the other stitching locations.

16. Apparatus comprising:
optical frequency domain reflectometry (OFDR) circuitry configured to perform the following tasks:
a—determine an initial OFDR data set including phase information for an optical fiber positioned in an initial configuration;
b—determine a first segment OFDR data set including phase information for the first segment of the optical fiber in a predetermined configuration;
c—determine a next segment OFDR data set including phase information for a next segment of the optical fiber positioned into the predetermined configuration, the next segment overlapping a portion of the first segment in the predetermined configuration;
d—match the first segment OFDR data set with a corresponding first portion of the initial OFDR data set;
e—match the next segment OFDR data set with a corresponding next portion of the initial OFDR data set;
f—compare phase information from matching OFDR data sets for the first and next segments in the overlapping portion of the first segment and the overlapping portion of the next segment to determine a phase difference for the overlapping portions;
g—use the phase difference to correct the next segment phase information;
h—extend the first segment phase information using the corrected next segment phase information to generate segment correction data, where at least some of the corrected next segment phase information is for a portion of the next segment that does not overlap the first segment; and
a memory configured to store the segment correction data.

17. The apparatus in claim 16, wherein the OFDR circuitry is further configured to modify the initial OFDR data set using the segment correction data to generate an OFDR reference data set.

18. The apparatus in claim 16, wherein the correction data compensates for changes in temperature or strain that occur between the OFDR data set for initial configuration and the OFDR data set for the predetermined configuration.

19. The apparatus in claim 16, wherein the OFDR circuitry is further configured to:
generate a measurement OFDR data set for a sensing application;
compare the measurement OFDR data set to the initial OFDR data set to determine tracked phase differences;
combine the segment correction data to correct the tracked phase differences; and use the corrected phase differences in the sensing application.

20. The apparatus in claim 16, wherein the OFDR circuitry is further configured to:
determine a phase differential between the segment correction data and initial OFDR data set;
modify the initial OFDR data set with the determined phase differential to generate a reference OFDR data set; and
use the reference OFDR data set in processing a measurement OFDR data set for a sensing application.

21. The apparatus in claim 16, wherein a length of the fiber is greater than 2 meters and a length of the first segment is on the order of 1 meter.

22. The apparatus in claim 16, wherein the first segment is located along the optical fiber at other than either end of the fiber.

23. The apparatus in claim 16, wherein the optical fiber includes multiple cores and wherein the OFDR circuitry is further configured to use the segment correction data to correct for a wobble factor associated with the optical fiber.

24. The apparatus in claim 16, wherein the optical fiber includes multiple cores and wherein the OFDR circuitry is further configured to use the segment correction data to correct for a twist factor associated with the multiple cores in the optical fiber.

25. The apparatus in claim 16, wherein the OFDR circuitry is further configured to:
perform tasks c-h for additional segments of the optical fiber to generate and store further segment correction data for the additional segments of the optical fiber.

26. The apparatus in claim 16, wherein the OFDR circuitry is further configured to:
determine different stitching locations along the overlapped portion between the first and next segments;
determine corrected next segment phase information for each of the different stitching locations;
evaluate the corrected next segment phase information for each of the different stitching locations; and
select one of the different stitching locations to use based on the evaluation.

27. The apparatus in claim 25, wherein the OFDR circuitry is further configured to stitch together segment phase information for the first, next, and additional segments of the optical fiber.

28. The apparatus in claim 26, wherein the fiber is a multicore fiber with multiple cores, and wherein the selected stitching location is associated with a lowest twist discontinuity for the multiple cores relative to the other stitching locations.

* * * * *